(12) United States Patent
Song et al.

(10) Patent No.: US 12,407,966 B2
(45) Date of Patent: Sep. 2, 2025

(54) REFRIGERATOR

(71) Applicant: SAMSUNG ELECTRONICS CO., LTD., Suwon-si (KR)

(72) Inventors: Youngil Song, Suwon-si (KR); Byoungmok Kim, Suwon-si (KR); Ilsung Bae, Suwon-si (KR); Jisu Rhie, Suwon-si (KR); Inyong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 18/202,090

(22) Filed: May 25, 2023

(65) Prior Publication Data
US 2024/0080596 A1  Mar. 7, 2024

Related U.S. Application Data

(63) Continuation of application No. PCT/KR2023/006439, filed on May 11, 2023.

(30) Foreign Application Priority Data

Sep. 1, 2022 (KR) .................. 10-2022-0111039
Oct. 20, 2022 (KR) .................. 10-2022-0136029

(51) Int. Cl.
H04R 1/02 (2006.01)
F25D 23/02 (2006.01)
H04R 1/26 (2006.01)

(52) U.S. Cl.
CPC ........... H04R 1/028 (2013.01); F25D 23/028 (2013.01); H04R 1/265 (2013.01)

(58) Field of Classification Search
CPC . H04R 1/028; H04R 1/02; H04R 1/08; H04R 1/265; H04R 1/2892; H04R 1/406;
(Continued)

(56) References Cited

U.S. PATENT DOCUMENTS 11,585,596 B2  2/2023  Hwang
11,698,224 B2  7/2023  Lee et al.
(Continued)

FOREIGN PATENT DOCUMENTS

CN  106196865 A  12/2016
CN  206817844 U  12/2017
(Continued)

OTHER PUBLICATIONS

International Search Report, PCT/ISA/210, dated Aug. 24, 2023, in PCT Application No. PCT/KR2023/006439.
(Continued)

Primary Examiner — Paul Kim
(74) Attorney, Agent, or Firm — STAAS & HALSEY LLP

(57) ABSTRACT

Disclosed herein is a refrigerator. The refrigerator includes a main body including a storage compartment, a door body rotatably coupled to the main body to open and close the storage compartment, and a front panel detachably coupled to the door body. The door body includes an upper cap including a trim receiving space. The front panel includes an upper trim inserted into the trim receiving space. A voice path is formed in the upper cap and a microphone module is provided in the upper trim to receive voice through the voice path.

14 Claims, 20 Drawing Sheets

(58) Field of Classification Search
CPC .......... E06B 3/70; F25D 23/02; F25D 23/028; F25D 29/00; F25D 29/005; G10L 15/28
USPC ........................................................ 381/111
See application file for complete search history.

(56) References Cited

U.S. PATENT DOCUMENTS

| | | |
|---|---|---|
| 12,276,453 B2 | 4/2025 | Lee et al. |
| 2020/0072544 A1* | 3/2020 | Lee ..................... F25D 11/02 |
| 2021/0318061 A1 | 10/2021 | Lee et al. |
| 2021/0321183 A1 | 10/2021 | Kwon et al. |

FOREIGN PATENT DOCUMENTS

| | | |
|---|---|---|
| CN | 216409463 U | 4/2022 |
| EP | 3 816 549 A1 | 5/2021 |
| JP | 2016-183786 | 10/2016 |
| JP | 2017-69835 | 4/2017 |
| KR | 10-2013-0005357 | 1/2013 |
| KR | 10-2019-0084860 | 7/2019 |
| KR | 10-2020-0070504 | 6/2020 |
| KR | 10-2021-0093475 | 7/2021 |
| KR | 10-2021-0125376 | 10/2021 |
| WO | WO 2022/154246 A1 | 7/2022 |

OTHER PUBLICATIONS

Written Opinion, PCT/ISA/237, dated Aug. 24, 2023, in PCT Application No. PCT/KR2023/006439.
European Search Report dated Jul. 14, 2025, in European Application No. EP 23 86 0592.

\* cited by examiner

REFRIGERATOR

CROSS-REFERENCE TO RELATED APPLICATION(S)

This application is a continuation application, under 35 U.S.C. § 111(a), of international application No. PCT/KR2023/006439, filed on May 11, 2023, which claims priority to Korean Patent Applications No. 10-2022-0111039, filed on Sep. 1, 2022, and No. 10-2022-0136029, filed on Oct. 20, 2022 in the Korean Intellectual Property Office, the disclosure of which is incorporated by reference herein in their entireties

BACKGROUND

1. Field

The disclosure relates to a refrigerator, and more particularly, to a refrigerator including a microphone module configured to receive voice.

2. Description of Related Art

A refrigerator is a home appliance that keeps food fresh by including a main body including a storage compartment, a cold air supply device configured to supply cold air to the storage compartment, and a door configured to open and close the storage compartment.

A microphone module may be provided in the refrigerator to implement voice recognition. Through voice recognition using a microphone module, various functions of the refrigerator may be operated, and Internet of things (IOT) devices connected to the refrigerator may be controlled.

As disclosed in Korean Patent Publication No. 10-2021-0093475, the microphone module may be mounted on a cap-deco that normally forms an upper surface of the door.

SUMMARY

Therefore, it is an aspect of the disclosure to provide a refrigerator including a door body rotatably coupled to a main body to open and close a storage compartment, and a front panel detachably mounted on the door body and including a microphone module arranged on a rear surface thereof.

It is another aspect of the disclosure to provide a refrigerator capable of excluding a microphone hole, which is for receiving voice through a microphone module, from a front panel.

It is another aspect of the disclosure to provide a refrigerator capable of easily connecting a display arranged on a rear surface of a front panel to a microphone module.

Additional aspects of the disclosure will be set forth in part in the description which follows and, in part, will be obvious from the description, or may be learned by practice of the disclosure.

In accordance with an aspect of the disclosure, a refrigerator includes a main body having a storage compartment, and a door body rotatably coupled to the main body to open and dose the storage compartment. The door body may include a door outer plate forming a front surface of the door body, and an upper cap coupled to an upper portion of the door outer plate, the upper cap having a fixer opening on an upper side of the upper cap, a trim opening on a front side of the upper door cap, and a trim receiving space. The refrigerator may include a front panel including an upper trim, a fixer, and a microphone module coupled to the upper trim. The door body, the front panel, and the fixer may be configured so that the upper trim is insertable into the trim receiving space through the trim opening, and, with the upper trim inserted into the trim receiving space through the trim opening, the fixer is insertable into the trim receiving space through the fixer opening to be coupled to the upper trim, to detachably couple the front panel to a front side of the door body with the microphone module disposed in the trim receiving space to receive voice through a voice path formed in the upper cap.

The upper cap may include a cap body, and a front upper wall on a front upper side of the cap body so that the trim receiving space is below the front upper wall. A voice guide hole penetrating the front upper wall may form part of the voice guide path.

The upper cap may include a cap protrusion protruding upward from a periphery of the voice guide hole. A voice guide space may be surrounded by the cap protrusion and form a part of the voice guide path.

The cap protrusion may include a cap front protrusion in front of the voice guide space, and a voice input hole may be formed in the cap front protrusion and may form a part of the voice guide path.

The voice input hole may be spaced apart from a lower surface of the front upper wall by a predetermined height.

The upper cap may include a protrusion upper opening on an upper side of the voice guide space, and the upper cap may include a cap cover that is coupleable to the upper cap to cover the protrusion upper opening.

The cap cover may include a cover body configured to cover the protrusion upper opening, with a lower surface of the cover body forming at least a part of the voice path, and a cover leg extending downward from the lower surface of the cover body and including a cover hooking member configured to hook to a lower surface of the front upper wall.

The upper trim may include a microphone module mounting member protruding rearward, and the microphone module mounting member may include a microphone module mounting space on a lower surface of the microphone module mounting member on which the microphone module is mounted, to thereby be coupled to the upper trim.

The microphone module may include a microphone substrate, and a microphone on a mounting surface of the microphone substrate, and the microphone module may be mounted in the microphone module mounting space with the mounting surface of the microphone substrate to facing downward. The microphone substrate may include a substrate voice hole penetrating the microphone substrate at a position corresponding to the microphone.

The upper trim may include a trim voice hole at a position corresponding to the substrate voice hole.

The refrigerator may include a sealing member between the microphone module mounting member and the microphone module. The sealing member may include a sealing member voice hole at a position corresponding to the trim voice hole and the substrate voice hole.

The upper trim may include a trim protrusion protruding upward and configured to be coupled to the cap cover in a state in which the upper trim is inserted into the trim receiving space and the cap cover is coupled to the upper cap.

The microphone module may include a connector electrically connected to an external circuit, and the connector may be on the mounting surface of the microphone substrate and positioned below the microphone substrate.

The upper trim may include a connector receiving member configured to receive the connector or other connector connected to the connector.

The microphone module may include a microphone substrate, and a plurality of microphones spaced apart from each other on a mounting surface of the microphone substrate. The voice path may include a plurality of voice paths separated from each other to correspond to the plurality of microphones.

In accordance with another aspect of the disclosure, a refrigerator includes a main body comprising a storage compartment; a door body rotatably coupled to the main body to open and close the storage compartment, the door body comprising a door outer plate forming a front surface of the door body and an upper cap coupled to an upper portion of the door outer plate and comprising a trim receiving space; a front panel detachably coupled to a front side of the door body and comprising an upper trim inserted into the trim receiving space through a trim opening formed on a front side of the upper cap; a fixer inserted into the trim receiving space through a fixer opening formed on an upper side of the upper cap, the fixer coupled to the upper trim; and a microphone module coupled to the upper trim and disposed in the trim receiving space together with the upper trim, wherein the upper cap comprises: a cap body; a front upper wall arranged on a front upper side of the cap body, and provided in such a way that the trim receiving space is formed below the front upper wall; and a stepped member formed by bending upward from the front upper wall to allow a voice path provided to receive voice to be formed between the front panel and the stepped member.

In accordance with another aspect of the disclosure, a home appliance includes a main body providing a cavity, a door body rotatably coupled to the main body to open and close the cavity, and having a trim receiving space in an upper portion of the door body, a front panel detachably coupled to a front side of the door body and including an upper trim protruding rearward from an upper portion of a rear surface of the front panel and received in the trim receiving space, and a microphone module coupled to the upper trim and disposed in the trim receiving space together with the upper trim. The door body may have a voice path between an outside of the door body and the trim receiving space to allow voice to be received by the microphone module.

The home appliance may further include a display on the rear surface of the front panel and configured to display an image through the front panel, and a display substrate provided on the rear surface of the front panel to drive the display.

The microphone module and the display substrate may be electrically connected to each other through a wire.

The upper trim may include a microphone module mounting member protruding rearward. The microphone module mounting member may include a microphone module mounting space on a lower surface of the microphone module mounting member, and on which the microphone module is mounted. The upper trim may have a trim voice hole penetrating the upper trim to guide voice to the microphone module.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
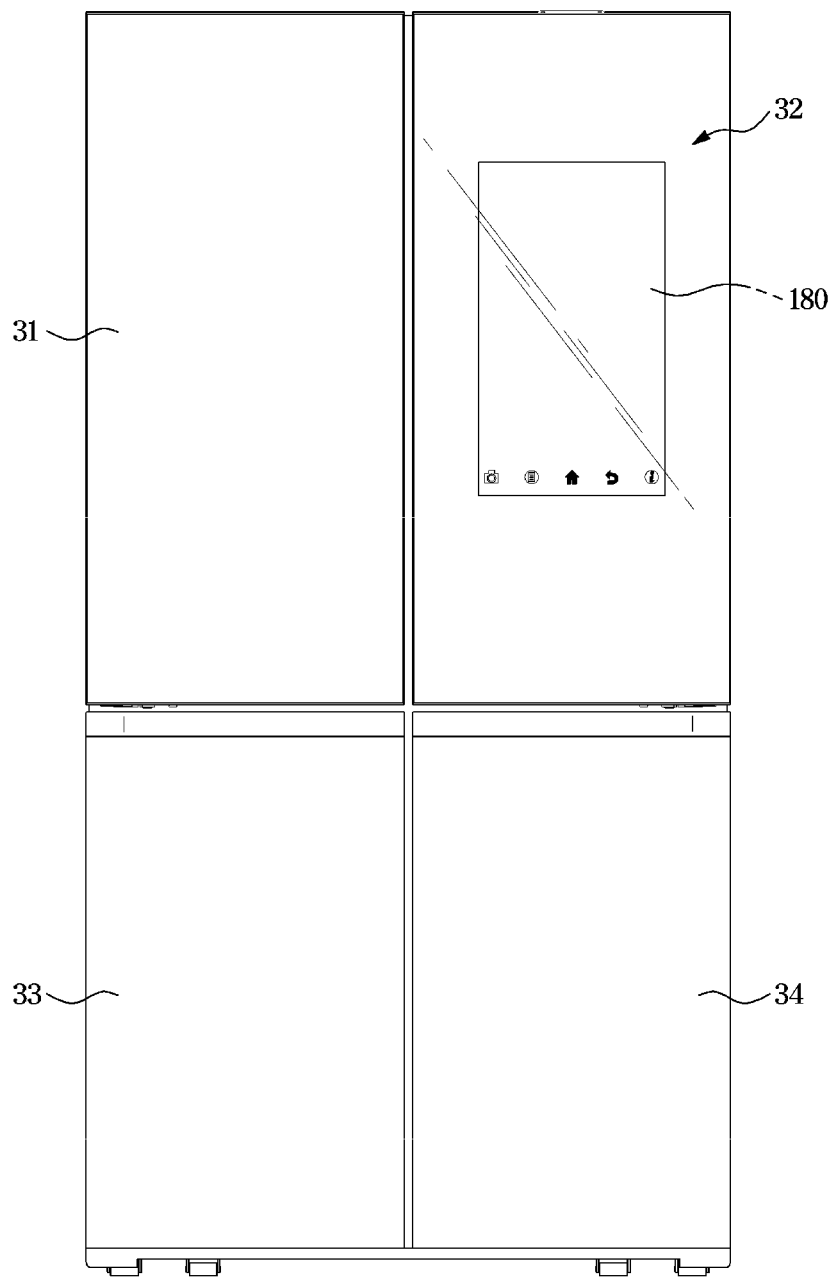
FIG. 1 is a view illustrating a front appearance of a refrigerator according to an embodiment of the disclosure.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (e.g., importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "including", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

A refrigerator according to an embodiment may include a main body.

The "main body" may include an inner case and an outer case disposed outside the inner case, and an insulating material provided between the inner case and the outer case.

The "inner case" may include a case, a plate, a panel or a liner that forms a storage compartment. The inner case may be formed as a single body or may be formed by assembling a plurality of plates. The "outer case" may form an exterior of the main body, and may be coupled to the outer side of the inner case to allow an insulating material to be disposed between the inner case and the outer case.

The "insulating material" may insulate the inside and outside of the storage compartment to allow a temperature inside the storage compartment to be maintained at a set appropriate temperature without being affected by the external environment of the storage compartment. According to an embodiment, the insulating material may include a foam insulating material. After fixing the inner and outer cases with a jig or the like, a foam insulating material may be molded by injecting and foaming urethane foam, in which polyurethane and a foaming agent are mixed, between the inner and outer cases.

According to an embodiment, the insulating material may include a vacuum insulating material in addition to the foam insulating material, or the insulating material may include only a vacuum insulating material instead of the foam insulating material. The vacuum insulating material may include a core material and an outer covering material that accommodates the core material and seals an inside with a vacuum or a pressure close to the vacuum. The vacuum insulating material may further include an adsorbent that adsorbs gas and moisture to stably maintain a vacuum state.

However, the insulating material is not limited to the above-described foam insulating material or vacuum insulating material, and may include various materials that may be used for insulation.

The refrigerator according to an embodiment may include a storage compartment provided inside the main body to store food.

The "storage compartment" may include a space defined by the inner case. The storage compartment may further include an inner case provided to define the space. The storage compartment may be formed to allow at least one side thereof to be opened in order to take in and out of food. The storage compartment may be provided to store "food". Food includes food that may be eaten or drunk, and specifically, may include meat, fish, seafood, fruits, vegetables, water, ice, beverages, kimchi or alcoholic beverages such as wine. However, in addition to food, medicines or cosmetics may be stored in the storage compartment, and there is no limitation in the items that may be stored in the storage compartment.

The refrigerator may include one or more storage compartments. When two or more storage compartments are formed in the refrigerator, each storage compartment may have a different purpose and may be maintained at different temperatures. For this, each of the storage compartments may be partitioned from each other by a partition wall including the insulating material. According to an embodiment, the partition wall may be a part of the main body. According to an embodiment, the partition wall may be a separate partition provided separately from the main body, and assembled to the main body.

The storage compartment may be provided to be maintained in an appropriate temperature range according to the purpose, and may include a "refrigerating compartment", a "freezing compartment" or a "variable temperature compartment" which are classified according to the purpose and/or temperature range. The refrigerating compartment may be maintained at a temperature suitable for storing food in a refrigerating manner, and the freezing compartment may be maintained at a temperature suitable for storing food in a freezing manner. "Refrigerating" may mean to cool food to the extent that it does not freeze, and as an example, the refrigerating compartment may be maintained in the range of 0 degrees Celsius to 7 degrees Celsius. "Freezing" may mean to freeze or cool food to remain frozen, and as an example, the freezing compartment may be maintained in the range of minus 20 degrees Celsius to minus 1 degree Celsius. The variable temperature compartment may be used as either the refrigerating compartment or the freezing compartment according to a user's choice or regardless of a user's choice. According to an embodiment, a portion of one storage compartment may be used as the refrigerating compartment and the remaining portion may be used as the freezing compartment.

The storage compartment may be called "vegetable compartment", "fresh compartment", "cooling compartment" and "ice making compartment" in addition to names such as "refrigerating compartment", "freezing compartment" and "variable temperature compartment". Terms such as "refrigerating compartment", "freezing compartment" and "variable temperature compartment" should be understood as encompassing storage compartments including corresponding uses and temperature ranges, respectively.

The refrigerator according to an embodiment may include a door configured to open and close one open side of the storage compartment.

The "door" may be configured to seal the storage compartment when the door is closed. In the similar manner as the main body, the door may include an insulating material to insulate the storage compartment when the door is closed.

The refrigerator according to an embodiment may include a cold air supply device configured to supply cold air to the storage compartment.

The "cold air supply device" may include a machine, an appliance, an electronic device, and/or a system corresponding to a combination thereof, which are capable of generating and guiding cold air to cool the storage compartment.

According to an embodiment, the cold air supply device may generate cold air through a refrigeration cycle including compression, condensation, expansion, and evaporation of a refrigerant. To this, the cold air supply device may include a refrigeration cycle device including a compressor, a condenser, an expansion device, and an evaporator capable of driving the refrigeration cycle. According to an embodiment, the cold air supply device may include a semiconductor such as a thermoelectric element. The thermoelectric element may cool the storage compartment by heating and cooling through the Peltier effect.

The refrigerator according to an embodiment may include a machine room in which at least some components belonging to the cold air supply device are disposed.

The "machine room" may be provided to be partitioned and insulated from the storage compartment in order to prevent heat, which is generated from components disposed in the machine room, from being transferred to the storage compartment. The inside of the machine room may be configured to communicate with the outside of the main body so as to dissipate heat from components disposed inside the machine room.

The refrigerator according to an embodiment may include a controller for controlling the refrigerator.

The "controller" may include a memory for storing or memorizing a program and/or data for controlling the refrigerator, and a processor for outputting a control signal for controlling the cold air supply device according to the program and/or data stored in the memory.

The memory may memorize programs and/or data for controlling components included in the refrigerator, and memorize temporary data that is generated while generating control signals for controlling components included in the refrigerator.

The processor may process a user input of the user interface according to a program and/or data memorized/stored in the memory, and may generate a control signal for controlling an operation of the user interface and/or the cold air supply device. For example, the processor may receive temperature information of the storage compartment from a temperature sensor and generate a cooling control signal for controlling the operation of the cold air supply device based on the temperature information of the storage compartment. The processor may receive a user input from the user interface, and transmit a display control signal and image data, which is for displaying an image on the user interface, to the user interface in response to the user input.

The controller may include the processor and the memory configured to control all components included in the refrigerator, and may further include a plurality of processors and a plurality of memories configured to individually control components of the refrigerator. For example, the controller may separately include a processor and a memory configured to control the operation of the cold air supply device according to the output of the temperature sensor, and a processor and a memory configured to control the operation of the user interface according to the user input. The processor and the memory may be provided integrally or separately. The processor may include a plurality of processors, and the memory may include a plurality of memories.

Reference will now be made in detail to embodiments of the disclosure, examples of which are illustrated in the accompanying drawings. Hereinafter the X-axis, Y-axis, and Z-axis are based on the coordinate axes shown in FIG. 2.

Figure 2:
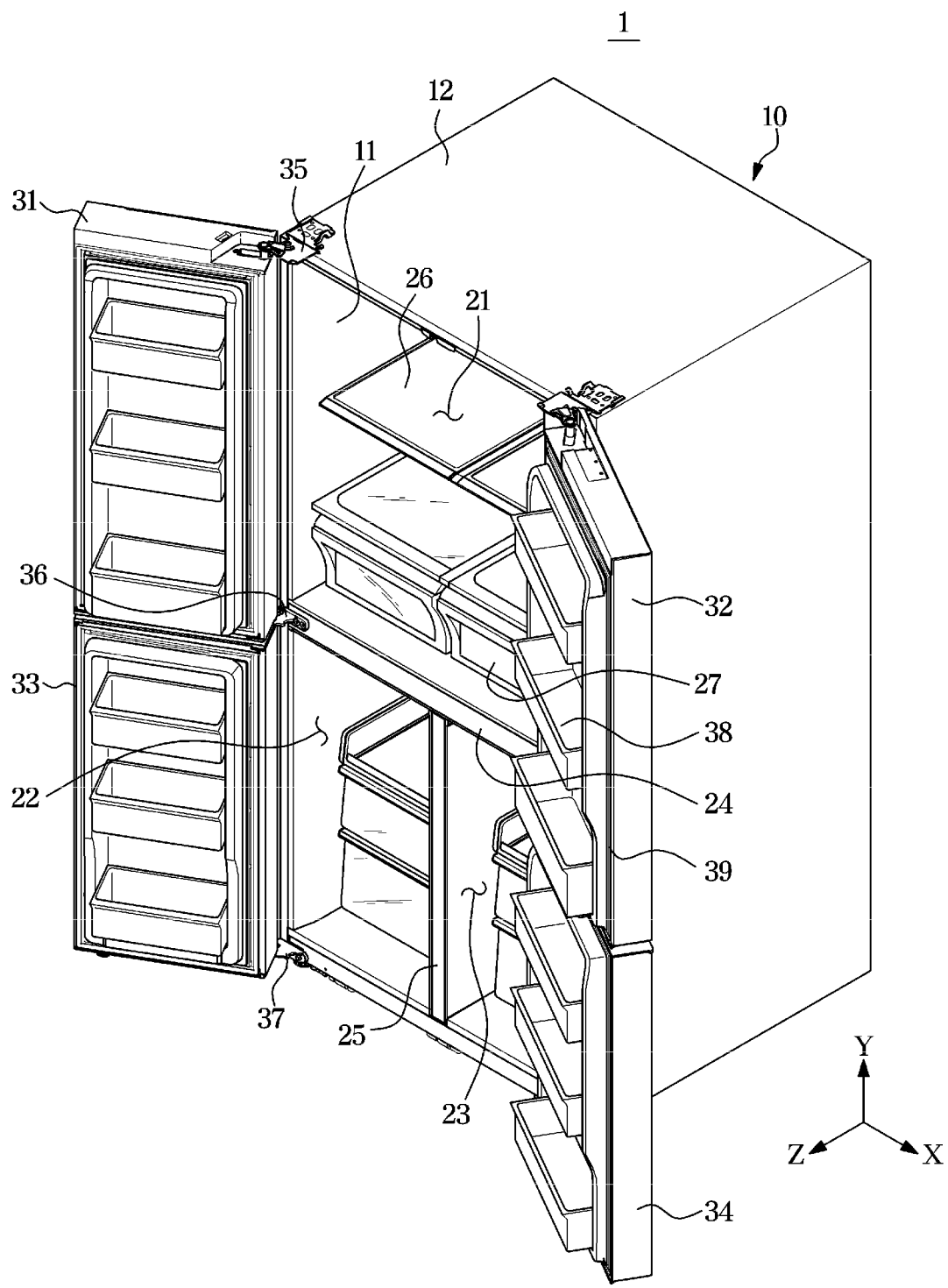
FIG. 2 is a view illustrating a state in which a door of the refrigerator is opened according to an embodiment of the disclosure.

FIG. 1 is a view illustrating a front appearance of a refrigerator according to an embodiment of the disclosure. FIG. 2 is a view illustrating a state in which a door of the refrigerator is opened according to an embodiment of the disclosure.

Referring to FIGS. 1 and 2, a refrigerator 1 according to an embodiment may include a main body 10, storage compartments 21, 22, and 23 formed inside the main body 10, doors 31, 32, 33, and 34 configured to open and close the storage compartments 21, 22, and 23, and a cold air supply device (not shown) configured to supply cold air to the storage compartments 21, 22, and 23.

The main body 10 may include an inner case 11 forming the storage compartments 21, 22, and 23, an outer case 12 coupled to the outside of the inner case 11 to form an exterior, and an insulating material (not shown) provided between the inner case 11 and the outer case 12 to insulate the storage compartments 21, 22, and 23.

The storage compartments 21, 22, and 23 may be divided into a plurality of compartments by a horizontal partition wall 24 and a vertical partition wall 25. The storage compartments 21, 22, and 23 may be partitioned into an upper storage compartment 21 and lower storage compartments 22, and 23 by the horizontal partition wall 24, and the lower storage compartments 22 and 23 may be partitioned into a right lower storage compartment 22 and a left lower storage compartment 23 by the vertical partition wall 25.

The upper storage compartment 21 may be used as a refrigerating compartment, and the lower storage compartments 22 and 23 may be used as a freezing compartment. However, the division and use of the storage compartments 21, 22, and 23 as described above is only an example, and is not limited thereto.

A shelf 26 on which foods are placed, and a storage container 27 storing food may be provided inside the storage compartments 21, 22, and 23.

The cold air supply device may generate cold air using a refrigeration circulation cycle of compressing, condensing, expanding, and evaporating a refrigerant, and supply the generated cold air to the storage compartments 21, 22, and 23.

The storage compartment 21 may be opened and closed by a pair of doors 31 and 32. The doors 31 and 32 may be rotatably coupled to the main body 10. The storage compartment 22 may be opened and closed by a door 33, and the door 33 may be rotatably coupled to the main body 10. The storage compartment 23 may be opened and closed by a door 34, and the door 34 may be rotatably coupled to the main body 10. Hinges 35, 36, and 37 may be provided in the main body 10 to rotatably couple the doors 31, 32, 33, and 34 to the main body 10.

A door shelf 38 on which foods are placed, and a gasket 39 provided to, when the doors 31, 32, 33 and 34 are closed, be in close contact with a front surface of the main body 10 may be provided on a rear surface of the doors 31, 32, 33 and 34.

A display 180 may be provided on the doors 31, 32, 33 and 34. However, the display 180 is not essential, and the display 180 may not be provided according to embodiments. The display 180 may display various information related to the state or operation of the refrigerator or display various applications for user convenience. In the drawings of the disclosure, the display 180 is provided on the door 32 on the upper left side, but the display 180 may be provided on other doors 31, 33, and 34. Hereinafter the door 32 on the upper left side will be described, but the following description may be equally applied to the other doors 31, 33 and 34.

Figure 3:
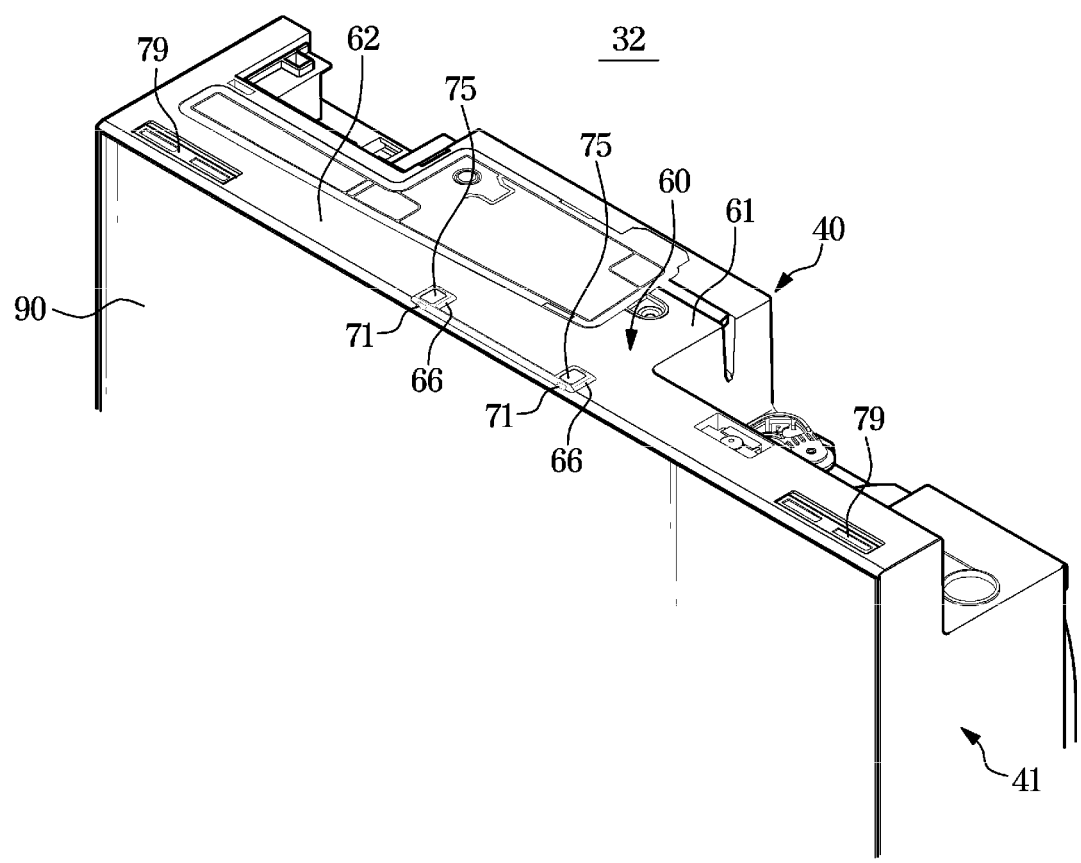
FIG. 3 is a view illustrating an upper portion of the door according to an embodiment of the disclosure.
Figure 4:
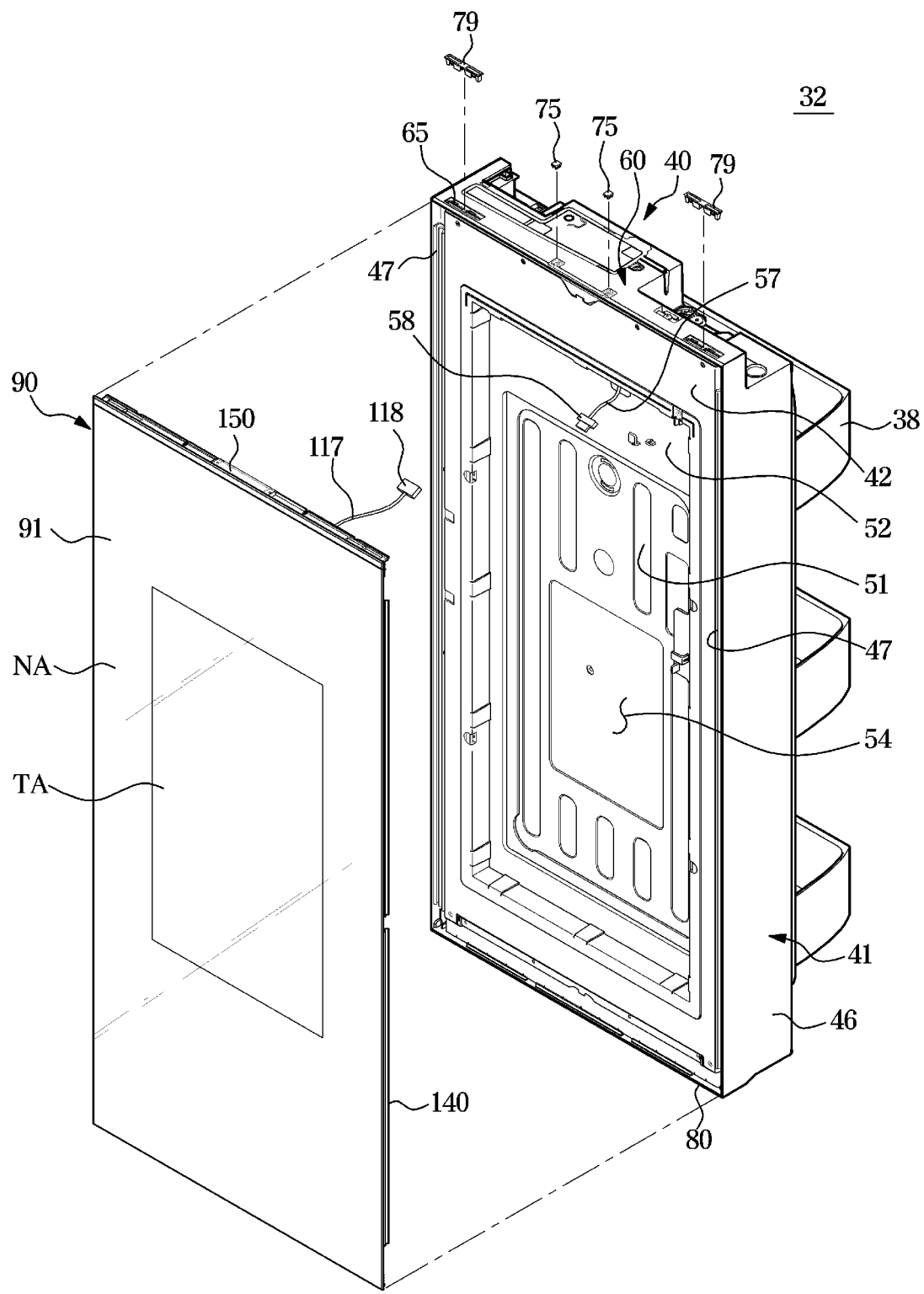
FIG. 4 is a view illustrating a state in which a door body and a front panel of the door are separated according to an embodiment of the disclosure.
Figure 5:
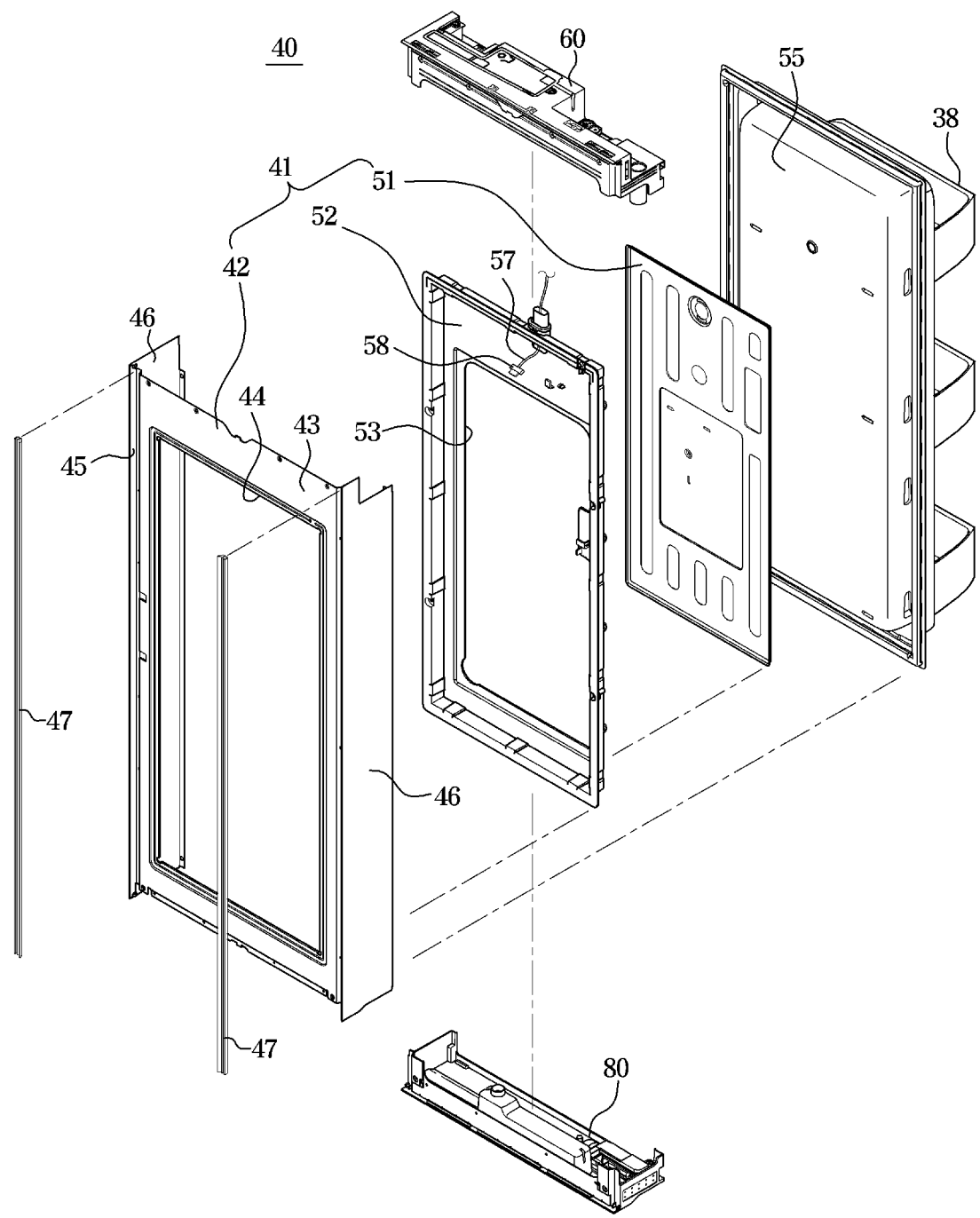
FIG. 5 is an exploded view illustrating the door body according to an embodiment of the disclosure.
Figure 6:
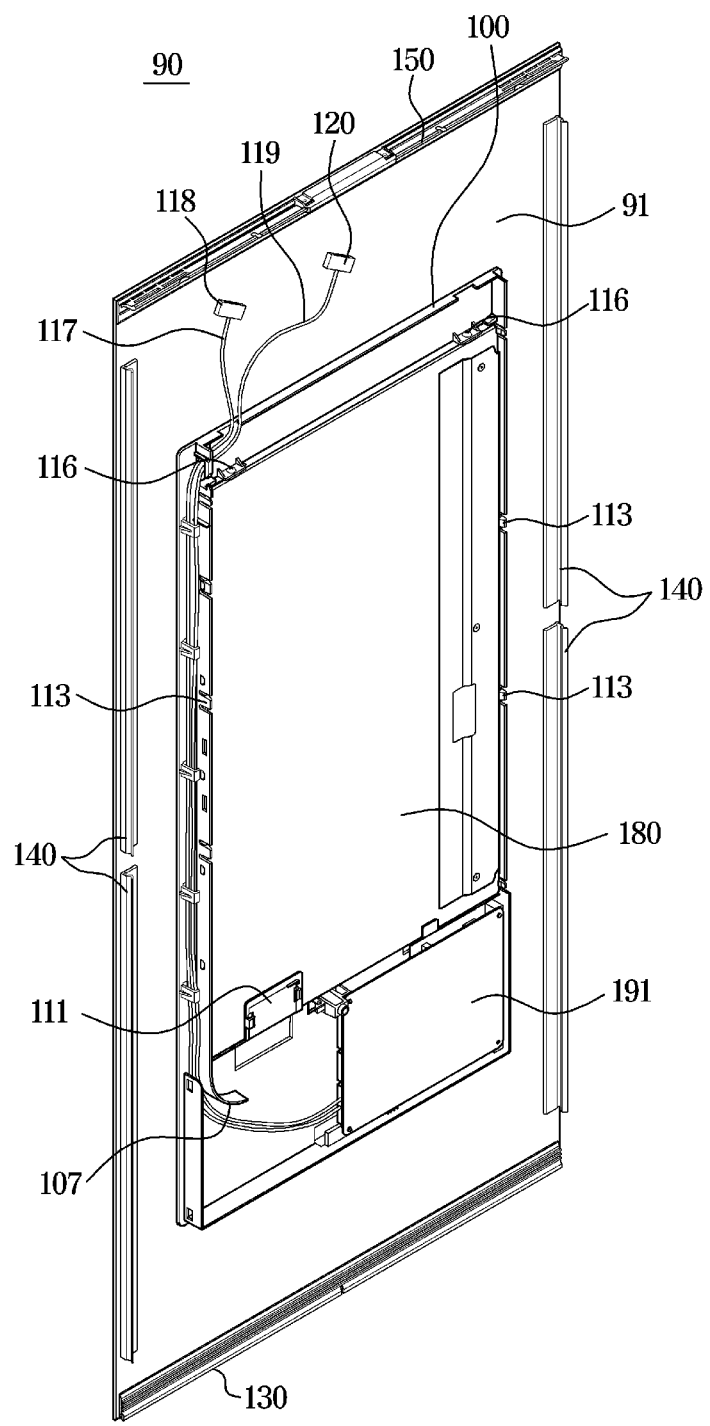
FIG. 6 is a view illustrating a rear surface of the front panel according to an embodiment of the disclosure.
Figure 7:
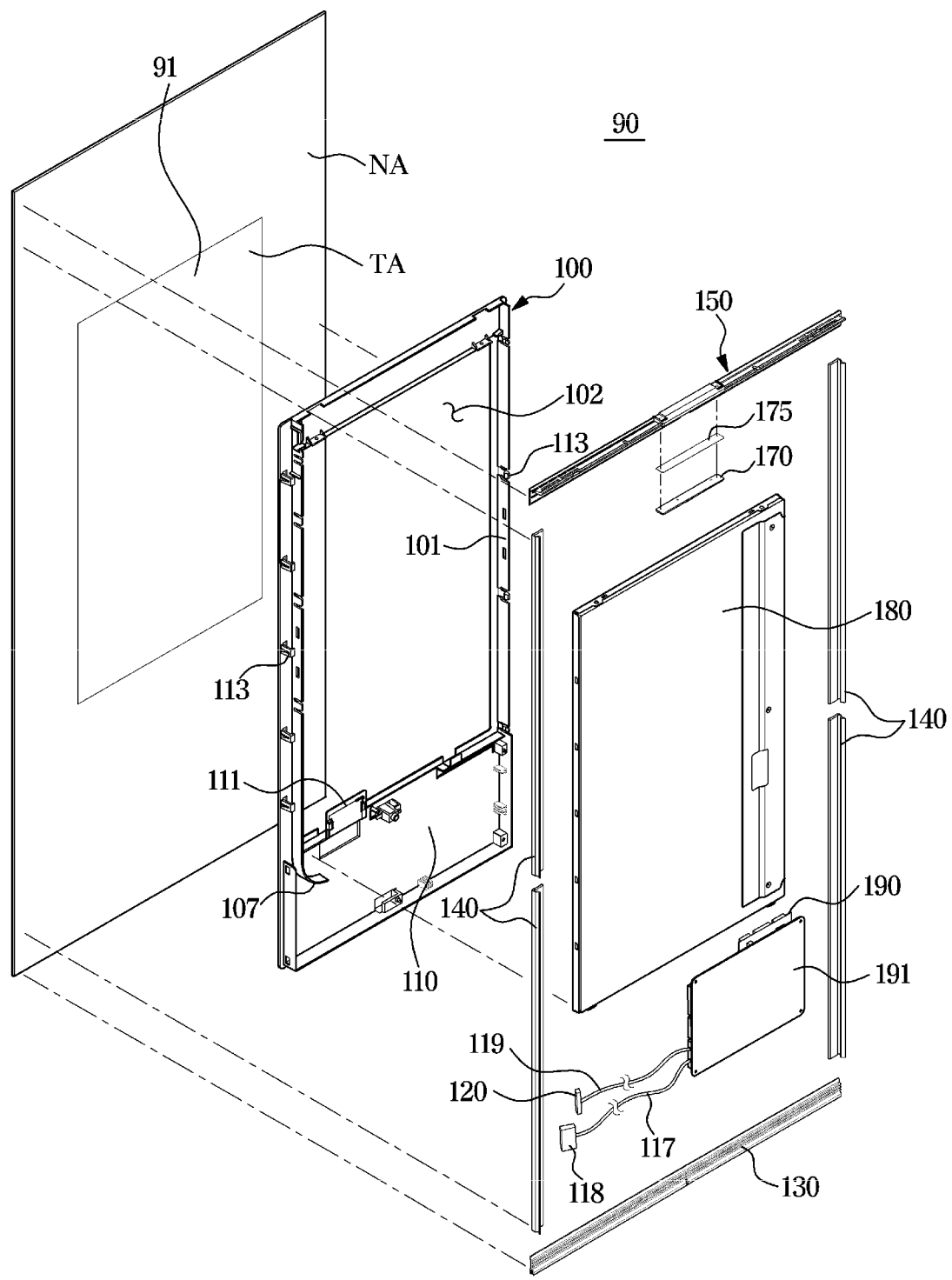
FIG. 7 is an exploded view illustrating the front panel according to an embodiment of the disclosure.
Figure 8:
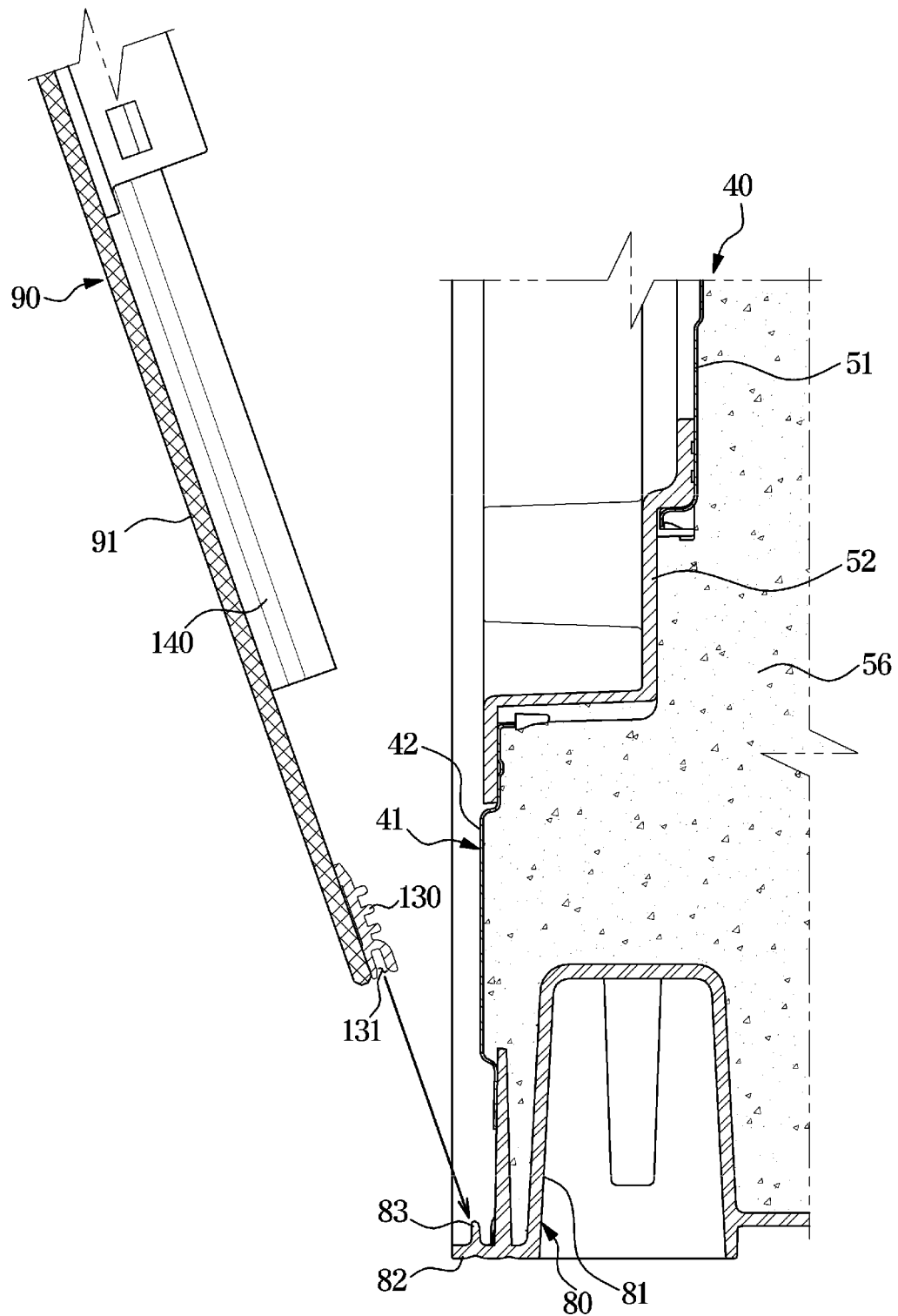
FIG. 8 is a view illustrating an operation of coupling the front panel to the door body according to an embodiment of the disclosure, particularly illustrating an operation of coupling a lower end of the front panel to a lower cap.
Figure 9:
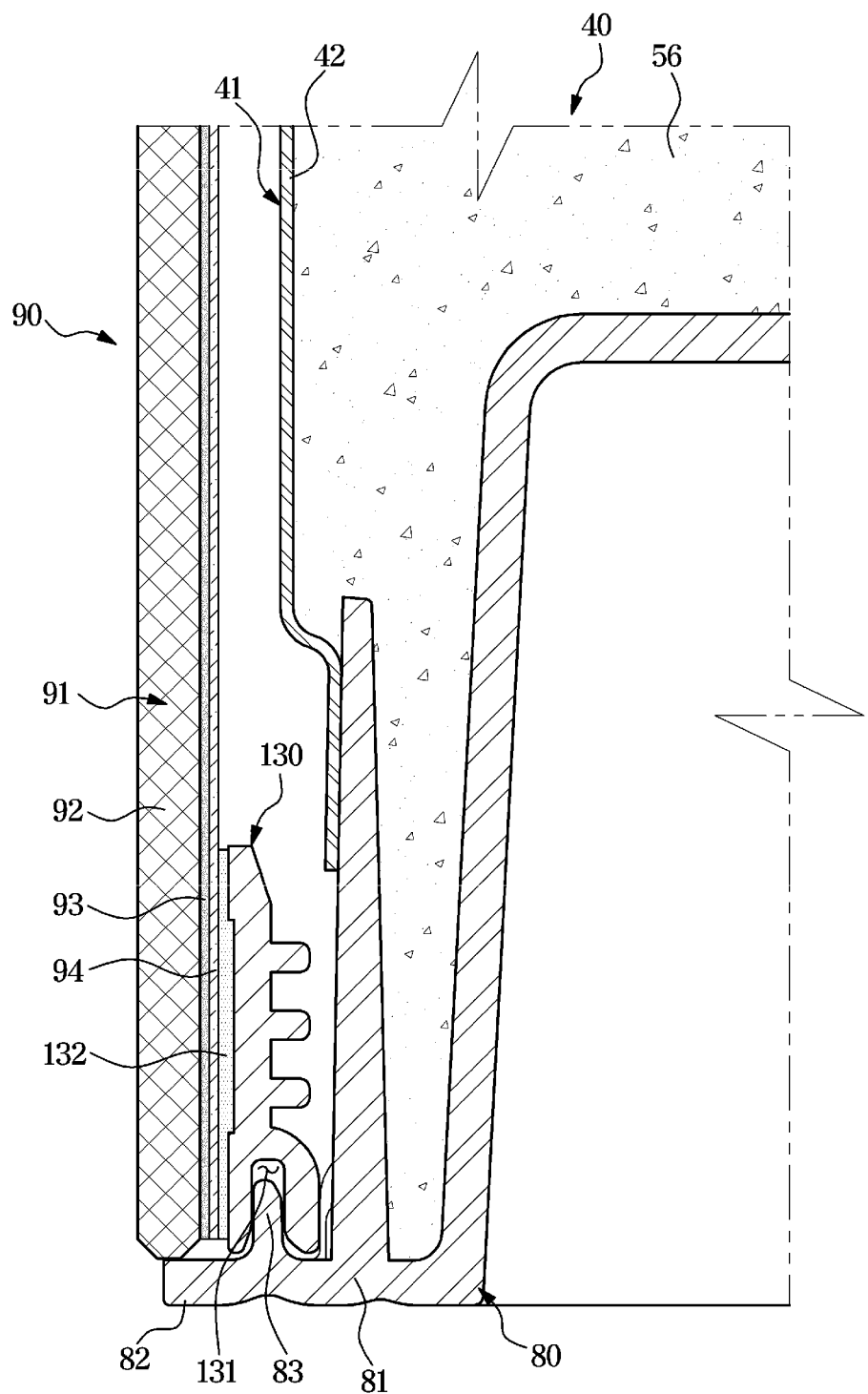
FIG. 9 is a view illustrating an operation of coupling the front panel to the door body according to an embodiment of the disclosure, particularly illustrating a state in which the front panel is rotated around the lower cap following the operation of FIG. 8.
Figure 10:
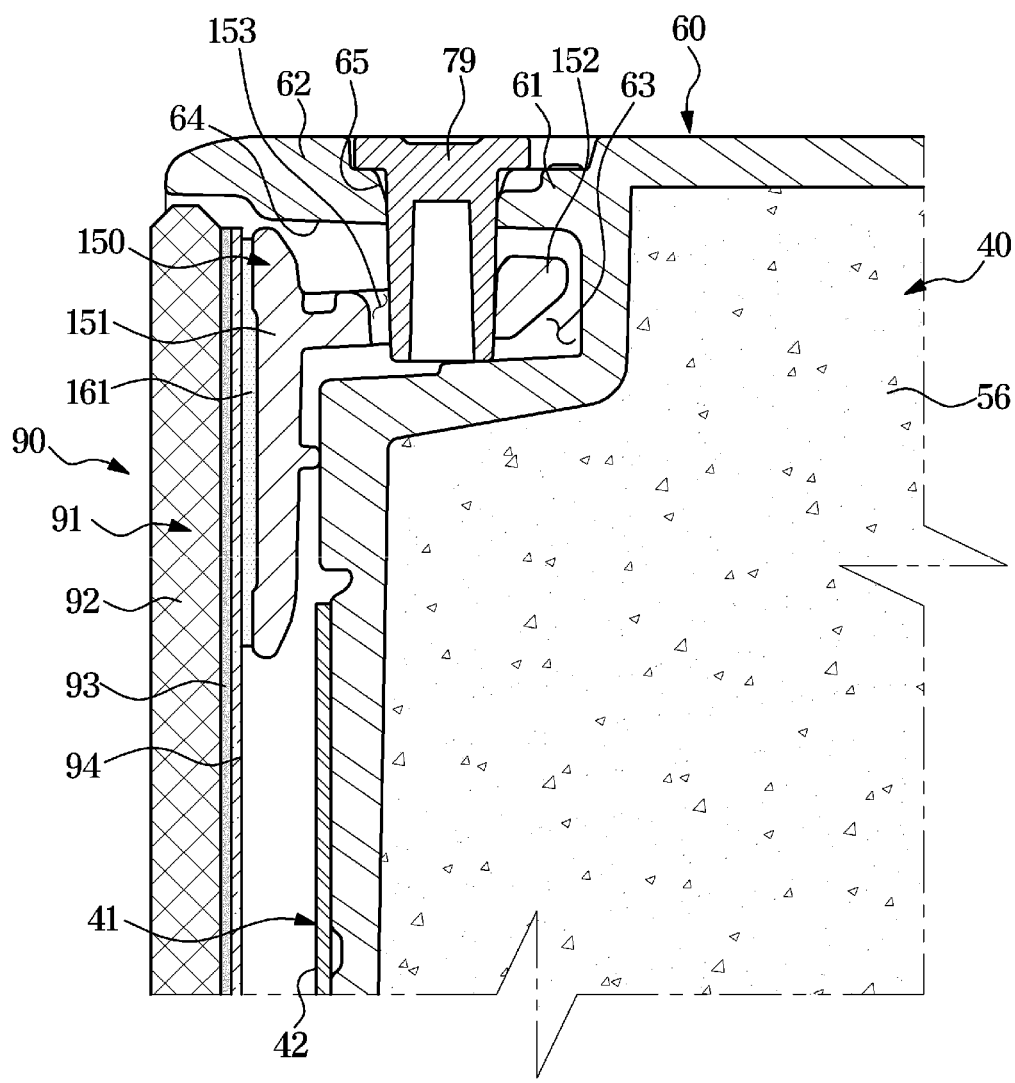
FIG. 10 is a view illustrating an operation of coupling the front panel to the door body according to an embodiment of the disclosure, particularly illustrating a state in which a fixer is coupled to an upper end of the front panel and an upper cap following the operation of FIG. 9.

FIG. 3 is a view illustrating an upper portion of the door according to an embodiment of the disclosure. FIG. 4 is a view illustrating a state in which a door body and a front panel of the door separated according to an embodiment of the disclosure. FIG. 5 is an exploded view illustrating the door body according to an embodiment of the disclosure. FIG. 6 is a view illustrating a rear surface of the front panel according to an embodiment of the disclosure. FIG. 7 is an exploded view illustrating the front panel according to an embodiment of the disclosure. FIG. 8 is a view illustrating an operation of coupling the front panel to the door body according to an embodiment of the disclosure, particularly illustrating an operation of coupling a lower end of the front panel to a lower cap. FIG. 9 is a view illustrating an operation of coupling the front panel to the door body according to an embodiment of the disclosure, particularly illustrating a state in which the front panel is rotated around the lower cap following the operation of FIG. 8. FIG. 10 is a view illustrating an operation of coupling the front panel to the door body according to an embodiment of the disclosure, particularly illustrating a state in which a fixer is coupled to an upper end of the front panel and an upper cap following the operation of FIG. 9.

Referring to FIGS. 3 to 10, the door 32 according to an embodiment of the disclosure may include a door body 40 and a front panel 90 detachably coupled to a front surface of the door body 40.

The door body 40 may be rotatably coupled to the main body 10 to open and close the storage compartment 21. The door body 40 may include a door outer plate 41, a door inner plate 55, an upper cap 60, and a lower cap 80 (refer to FIG. 5). The outer door plate 41, the inner plate 55, the upper cap 60, and the lower cap 80 may be coupled to each other to form an inner space. An insulating material 56 (refer to FIG. 8) may be provided in the inner space of the door body 40.

The door outer plate 41 may include a main plate 42 including a main plate opening 44, and a first heat dissipation plate 51 and a second heat dissipation plate 52 coupled to the main plate opening 44 to dissipate heat emitted from the display 180.

The main plate 42 may include a front member 43 forming the front surface of the door body 40. The main plate 42 may include side members 46 forming both left and right sides of the door body 40. The main plate 42 may be formed in a bent shape to include the front member 43 and the both side members 46. However, the front member 43 and the side member 46 may be formed separately and assembled with each other.

A holder mounting groove 45, into which a holder 47 for coupling with the front panel 90 is mounted, may be formed on the left and right edges of the front member 43.

The main plate opening 44 may be formed in the center of the front member 43. The heat dissipation plates 51 and 52 may form a display accommodating member 54 (refer to FIG. 4) concavely formed to accommodate the display 180. The heat dissipation plates 51 and 52 may include the first heat dissipation plate 51, and the second heat dissipation plate 52 coupled to an outer surface of the first heat dissipation plate 51.

The second heat dissipation plate 52 may include a heat dissipation plate opening 53 formed at a central portion of the second heat dissipation plate 52. The first heat dissipation plate 51 may be coupled to the heat dissipation plate opening 53 of the second heat dissipation plate 52.

The first heat dissipation plate 51 may be formed of a material having high thermal conductivity to efficiently dissipate heat emitted from the display 180 to the surroundings. For example, the first heat dissipation plate 51 may be formed of a metal material. The second heat dissipation plate 52 may be injection molded from a plastic material to easily mold a structure for coupling with the main plate 42 or a structure for guiding cables.

As described above, the outer door plate 41 may include the first heat dissipation plate 51 and the second heat dissipation plate 52 to efficiently dissipate heat emitted from the display 180. Alternatively, the first heat dissipation plate 51 may be directly coupled to the main plate opening 44 without the second heat dissipation plate 52. Further, the outer door plate 41 may be composed of only the main plate 42 without the first heat dissipation plate 51 and the second heat dissipation plate 52. In this case, the main plate opening 44 of the main plate 42 may be omitted.

The upper cap 60 and the lower cap 80 may be injection molded from a plastic material. A structure that allows the front panel 90 to be detachably mounted to the door body 40 may be formed on the upper cap 60 and the lower cap 80. This will be described later. A handle provided to be gripped to open and close the door 32 may be recessed on a lower surface of the lower cap 80. However, in the lower doors 33 and 34, the handle may be formed on the upper cap instead of the lower cap.

The front panel 90 may be detachably mounted on the front surface of the door body 40. The front panel 90 may be provided to cover the entire front region of the door body 40. The front panel 90 may be formed to have a size corresponding to the size of the front surface of the door body 40.

The front panel 90 may include a panel body 91, a lower trim 130 provided on a lower end of a rear surface of the panel body 91, and an upper trim 150 provided on an upper end of the rear surface of the panel body 91 (refer to FIGS. 6 and 7). The lower trim 130 and the upper trim 150 may be formed separately from the panel body 91 and attached to the panel body 91. Alternatively, the lower trim 130 and the upper trim 150 may be integrally formed with the panel body 91.

The panel body 91 may be formed of a glass material. However, it is not limited thereto, and the panel body 91 may be formed of a steel plate material or a plastic material.

The panel body 91 may include a transparent area TA which is seen through and a non-transparent area NA which is not seen through. The transparent area TA may be provided in the central portion of the panel body 91. The inside of the panel body 91 may be seen through the transparent area TA from the outside of the refrigerator.

The panel body 91 may include a glass member 92 that is seen through, and a decorative layer 93 attached to a rear surface of the glass member 92 (refer to FIGS. 9 and 10). The glass member 92 may include glass or plastic that is transparent the same as glass. The decorative layer 93 may be formed of an opaque material which is not seen through. The decorative layer 93 may be formed on a portion of the rear surface of the glass member 92.

As mentioned above, by the decorative layer 93 formed on the rear surface of the glass member 92, the panel body 91 may include the transparent area TA and the non-transparent area NA. The transparent area TA may be an area in which the decorative layer 93 is not formed. The non-transparent area NA may be an area in which the decorative layer 93 is formed.

A screen of the display 180 disposed behind the panel body 91 may be exposed through the transparent area TA. The color and pattern of the decorative layer 93 may be seen from the front outsider side of the refrigerator through the non-transparent area NA.

The front panel 90 may further include a shatterproof film 94 provided to prevent the glass member 92 from scattering when the glass member 92 is broken. The shatterproof film 94 may be provided on the rear surface of the decorative layer 93.

The front panel 90 may further include a touch film (not shown) for inputting a signal to the display 180. The touch film may be provided inside the transparent area TA on the rear surface of the glass member 92 to correspond to the screen of the display 180.

The front panel 90 may include the display 180 provided on the rear surface of the panel body 91. The display 180 may be provided on the rear surface of the front panel 90 in such a way that a screen, on which an image is displayed, faces forward. The display 180 may be provided inside the transparent area TA on the rear surface of the panel body 91. Accordingly, the screen of the display 180 may be displayed to the outside through the transparent area TA. The screen of the display 180 may substantially correspond to the size and shape of the transparent area TA.

The front panel 90 may include a support plate 100. The support plate 100 may fix the display 180 to the rear surface of the front panel 90 to allow the screen of the display 180 to face forward. The support plate 100 may be coupled to the rear surface of the panel body 91. The display 180 may be mounted on the rear side of the support plate 100.

The support plate 100 may be fixed to the rear surface of the panel body 91 through an adhesive such as silicon or hot melt. The support plate 100 may include a display mounting member 101 on which the display 180 is mounted. The support plate 100 may include a substrate mounting member 110 on which a display substrate 190 configured to drive the display 180 is mounted. The substrate mounting member 110 may be formed in a box shape with an open rear surface. The substrate mounting member 110 may be formed below the display mounting member 101.

Accordingly, because the display substrate 190 is arranged vertically without overlapping the display 180, a thickness of the front panel 90 may be reduced. The front panel 90 may include a substrate cover 191 to cover the display substrate 190 mounted on the substrate mounting member 110. As described above, according to an embodiment of the disclosure, the display 180 and the display substrate 190 may be mounted on the rear surface of the panel body 91 and integrated with the panel body 91. Accordingly, it is easy to connect the display 180 and the display substrate 190 with a wire.

Alternatively, the display 180 may be mounted on the panel body 91, but the display substrate 190 may be mounted on the door body 40 instead of the panel body 91.

After the support plate 100 is fixed to the rear surface of the panel body 91, the display 180 may be mounted on the display mounting member 101 of the support plate 100. The display 180 may be mounted on the rear side of the display mounting member 101. The display 180 may be mounted on the display mounting member 101 in a direction from rear to front. Due to the above structure, when removing or replacing the display 180, there is no need to separate the support plate 100 from the panel body 91. Accordingly, even in a state in which the support plate 100 is mounted on the panel body 91, it is possible to separate the display 180 from the support plate 100 and replace the display 180.

The support plate 100 may include a support plate opening 102 having a size corresponding to the screen of the display 180 to allow the screen of the display 180 not to be covered by the support plate 100.

The display mounting member 101 may have a rectangular frame shape. The display mounting member 101 may support a front edge of the display 180. The display mounting member 101 may support an upper surface, a lower surface, a left surface and a right surface of the display 180.

The support plate 100 may include a guide rib 111 provided to guide the display 180 to the display mounting member 101.

The support plate 100 may include a locking hook 113 provided to be elastically deformable, so as to fix the display 180 mounted on the display mounting member 101. The locking hook 113 may be elastically deformed to open outward while the display 180 is mounted on the display mounting member 101, and when the display 180 is completely mounted on the display mounting member 101, the locking hook 113 may be restored to its original state so as to support the display 180.

After the display 180 is inserted into the display mounting member 101, the display 180 may be fixed to the display mounting member 101 by a fastening member 116.

The support plate 100 may include a cable guide 107 provided to guide a first wire cable 117 and a second wire cable 119. The cable guide 107 may include a rounded member of the substrate mounting member 110.

The first wire cable 117 may electrically connect the display substrate 190 and a power supply device (not shown) provided in the main body 10. The display substrate 190 may receive power through the first wire cable 117. The second wire cable 119 may electrically connect the display substrate 190 to a microphone module 170. The display substrate 190 and the microphone module 170 may exchange power and signals through the second wire cable 119.

A first connector 118 may be provided at an end, which is opposite to the display substrate 190, of the first wire cable 117. A second connector 120 may be provided at an end, which is opposite to the display substrate 190, of the second wire cable 119. When the front panel 90 is coupled to the door body 40, the first connector 118 may be coupled to a third connector 58 provided on the side of the door body 40. Through a third wire cable 57, the third connector 58 may be electrically connected to the power supply provided in the main body 10. The third wire cable 57 may connect the third connector 58 to the power supply provided in the main body 10 through a hinge shaft provided to connect the door body 40 and the main body 10. The second connector 120 may be coupled to a microphone connector 174 (refer to FIG. 12) of the microphone module 170.

The front panel 90 may include the lower trim 130 and the upper trim 150 for coupling with the door body 40. The lower trim 130 may be provided at the lower end of the rear surface of the panel body 91. The lower trim 130 may be formed separately from the panel body 91 and attached to the panel body 91. The lower trim 130 may be attached to the panel body 91 using an adhesive 132. Alternatively, the lower trim 130 may be integrally formed with the panel body 91. The lower trim 130 may be elongated in the left and right direction (X-axis direction). The lower trim 130 may be elongated along the lower edge of the panel body 91.

When the front panel 90 is coupled to the door body 40, the lower trim 130 may be supported by the lower cap 80. When the front panel 90 is coupled to the door body 40, the lower surface of the lower trim 130 may be covered by the lower cap 80. Accordingly, the lower trim 130 may not be exposed to the outside.

The lower trim 130 may include a lower trim groove 131. The lower trim groove 131 may open downward. However, according to embodiments, the lower trim 130 may include a through hole formed to vertically penetrate the lower trim 130 instead of a downwardly open groove. When the front panel 90 is coupled to the door body 40, a lower cap protrusion 83 of the lower cap 80 may be inserted into the lower trim groove 131.

In a state in which the front panel 90 is inclined, the lower cap protrusion 83 may be inserted into the lower trim groove 131. In a state in which the lower cap protrusion 83 is inserted into the lower trim groove 131, the front panel 90 may rotate around the lower cap protrusion 83. That is, the front panel 90 may move from an inclined state to an upright state by rotating around the lower cap protrusion 83 in a state in which the lower cap protrusion 83 is inserted into the lower trim groove 131. Alternatively, the front panel 90 may move from the upright state to the inclined state in the same way.

Figure 12:
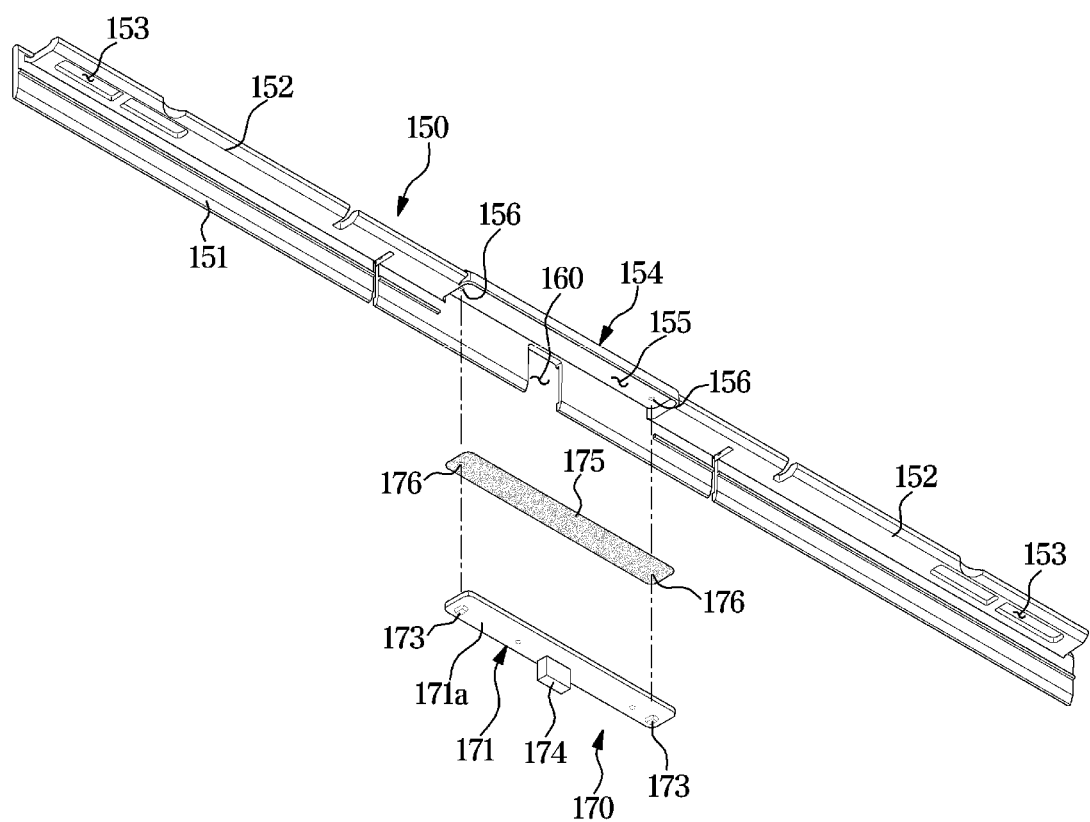
FIG. 12 is a bottom view of the upper fixer and the microphone module according to an embodiment of the disclosure, particularly illustrating a state in which the upper fixer and the microphone module are separated.

Referring to FIG. 12, the upper trim 150 may be provided at an upper end of the rear surface of the panel body 91. The upper trim 150 may be formed separately from the panel body 91 and attached to the panel body 91. The upper trim 150 may be attached to the rear surface of the panel body 91 using an adhesive 161. Alternatively, the upper trim 150 may be integrally formed with the panel body 91. The upper trim 150 may be elongated in the left and right direction (X-axis direction). The upper trim 150 may be elongated along the upper edge of the panel body 91.

When the front panel 90 is coupled to the door body 40, the upper trim 150 may be covered by the upper cap 60. Accordingly, the upper trim 150 may not be exposed to the outside.

The upper trim 150 may include an upper trim body 151 attached to the rear surface of the panel body 91 and having a flat shape. The upper trim body 151 may include an adhesive surface on which the upper trim 150 is attached to the panel body 91.

The upper trim 150 may include a fixer coupler 152 protruding rearward (−Z direction). The fixer coupler 152 may extend rearward from the upper trim body 151. The fixer coupler 152 and the upper trim body 151 may be integrally formed. The fixer coupler 152 may extend rearward from the upper portion of the upper trim body 151. The fixer coupler 152 may be provided at both ends of the upper trim 150 in the left and right direction (refer to FIG. 11).

The fixer coupler 152 may be inserted into the upper cap 60. For example, the fixer coupler 152 may be inserted into a trim receiving space 63 of the upper cap 60. A trim opening 64 may be formed on the front side of the trim receiving space 63 of the upper cap 60. The fixer coupler 152 of the upper trim 150 may be inserted into the trim receiving space 63 of the upper cap 60 through the trim opening 64 of the upper cap 60.

The fixer coupler 152 may include a fixer coupling hole 153. The fixer coupling hole 153 may be formed to vertically penetrate the fixer coupler 152. A fixer 79 may be coupled to the upper trim 150. For example, the fixer 79 may be coupled to the fixer coupling hole 153 of the upper trim 150. The fixer 79 may be inserted into the fixer coupling hole 153. A fixer opening 65 may be formed on the upper side of the trim receiving space 63 of the upper cap 60. At least one portion of the fixer 79 may be inserted into the trim receiving space 63 of the upper cap 60 through the fixer opening 65 of the upper cap 60.

When the fixer coupler 152 of the upper trim 150 is inserted into the trim receiving space 63 of the upper cap 60, the fixer 79 may be inserted in the trim receiving space 63 of the upper cap 60 through the fixer opening 65 of the upper cap 60, and the fixer 79 may be coupled to the fixer coupler 152 of the upper trim 150. Due to the above configuration, the front panel 90 may be coupled to the door body 40.

The upper trim 150 may include a microphone module mounting member 154 (refer to FIGS. 11 to 13) protruding rearward (−Z direction). The microphone module 170 may be mounted on the microphone module mounting member 154. The microphone module mounting member 154 may extend rearward from the upper trim body 151. The microphone module mounting member 154 and the upper trim body 151 may be integrally formed. The microphone module mounting member 154 and the fixer coupler 152 may be integrally formed.

The microphone module mounting member 154 may extend rearward from the upper portion of the upper trim body 151. The microphone module mounting member 154 may be provided at the center side of the upper trim 150 with respect to the left and right direction. The fixer coupler 152 may be provided on both sides of the microphone module mounting member 154.

The microphone module mounting member 154 may be inserted into the upper cap 60. For example, the microphone module mounting member 154 may be inserted into the trim receiving space 63 of the upper cap 60. The trim opening 64 may be formed on the front side of the trim receiving space 63 of the upper cap 60. The microphone module mounting member 154 of the upper trim 150 may be inserted into the trim receiving space 63 of the upper cap 60 through the trim opening 64 of the upper cap 60.

The front panel 90 may include a side trim 140 for coupling with the door body 40. The side trim 140 may be provided to extend vertically on the left and right edge of the panel body 91. The side trim 140 may be formed separately from the panel body 91 and attached to the panel body 91. Alternatively, the side trim 140 may be integrally formed with the panel body 91.

The side trim 140 may be coupled to the holder 47 mounted on the door body 40. As the side trim 140 is coupled to the holder 47, both sides of the front panel 90 may be in close contact with the door body 40.

According to embodiments, the front panel 90 may include a magnet instead of the side trim 140. In this case, the holder mounting groove 45 and the holder 47 of the door body 40 may be omitted. The front member 43 of the door body 40 may be formed of an iron plate material so as to be in close contact with the magnet.

Referring to FIGS. 8 and 9, the lower cap 80 of the door body 40 may be coupled to the lower portion of the door outer plate 41. The lower cap 80 may form the lower surface of the door body 40. The lower cap 80 may include a lower cap body 81. The lower cap 80 may include a lower cap support 82 protruding forward from a lower portion of the lower cap body 81. The lower cap support 82 may be formed to protrude forward from the door outer plate 41. The lower cap support 82 may support the lower end of the front panel 90. The lower cap 80 may include the lower cap protrusion 83 protruding upward from the lower cap support 82. When the front panel 90 is coupled to the door body 40, the lower cap protrusion 83 may be inserted into the lower trim groove 131 of the lower trim 130.

Referring to FIG. 10, the upper cap 60 of the door body 40 may be coupled to the upper portion of the door outer plate 41. The upper cap 60 may form an upper surface of the door body 40. The upper cap 60 may include an upper cap body 61.

The upper cap 60 may include a front upper wall 62 protruding forward from an upper portion of the upper cap body 61. The front upper wall 62 may be elongated in the left and right direction.

The upper cap 60 may include the trim receiving space 63 formed below the front upper wall 62. The trim receiving space 63 may be elongated in the left and right direction.

The upper cap 60 may include the trim opening 64 formed on the front side of the trim receiving space 63 to allow the upper trim 150 of the front panel 90 to be inserted into the trim receiving space 63. The trim opening 64 may be elongated in the left and right direction.

The upper cap 60 may include the fixer opening 65 formed on the upper side of the trim receiving space 63 to allow the fixer 79 to be inserted into the trim receiving space 63. The fixer opening 65 may be formed at a position corresponding to the fixer coupling hole 153 of the upper trim 150.

The upper cap 60 may include a voice path 70 (refer to FIG. 15) to guide external voice to the microphone module 170 mounted on the upper trim 150. The voice path 70 will be described later.

A process of coupling the front panel 90 to the door body 40 will be described with reference to FIGS. 8 to 10. The lower cap protrusion 83 is inserted into the lower trim groove 131 by tilting the front panel 90. In a state in which the lower cap protrusion 83 is inserted into the lower trim groove 131, the front panel 90 becomes upright by rotating the front panel 90 around the lower cap protrusion 83.

While the front panel 90 rotates, the fixer coupler 152 of the upper trim 150 may be inserted into the trim receiving space 63 of the upper cap 60 through the trim opening 64 of the upper cap 60. The fixer 79 is inserted into the trim receiving space 63 from top to bottom through the fixer opening 65 of the upper cap 60. The fixer 79 may be coupled to the upper trim 150 in the trim receiving space 63. The fixer 79 may be inserted into the fixer coupling hole 153 of the fixer coupler 152 of the upper trim 150. The front panel 90 may be coupled to the door body 40 as the fixer 79 is coupled to the upper trim 150.

Before standing the front panel 90 completely, the first connector 118 connected to the display substrate 190 of the front panel 90 may be coupled to the third connector 58 on the side of the door body 40.

In order to separate the front panel 90 from the door body 40, the above sequence may be reversed. That is, the front panel 90 may be separated from the door body 40 while rotating the front panel 90 in the opposite direction after separating the fixer 79 from the upper trim 150 by pulling the fixer 79 up from the bottom.

Figure 11:
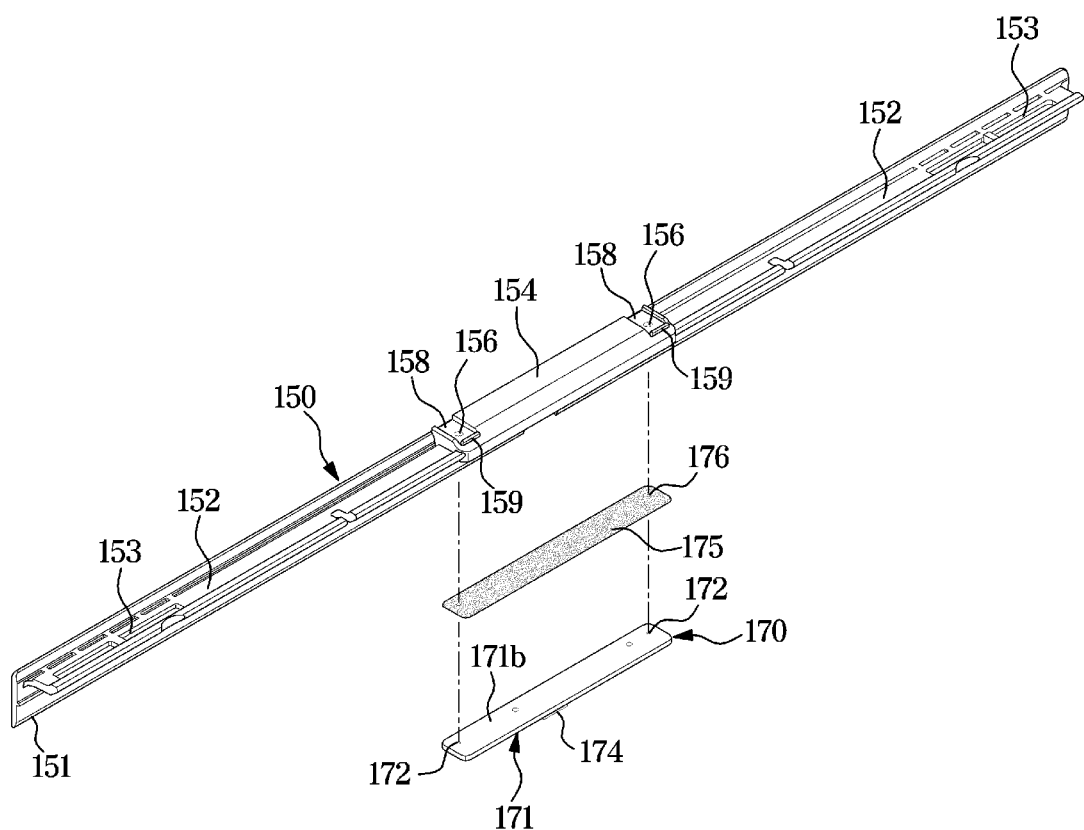
FIG. 11 is a view illustrating an upper fixer and a microphone module according to an embodiment of the disclosure.
Figure 13:
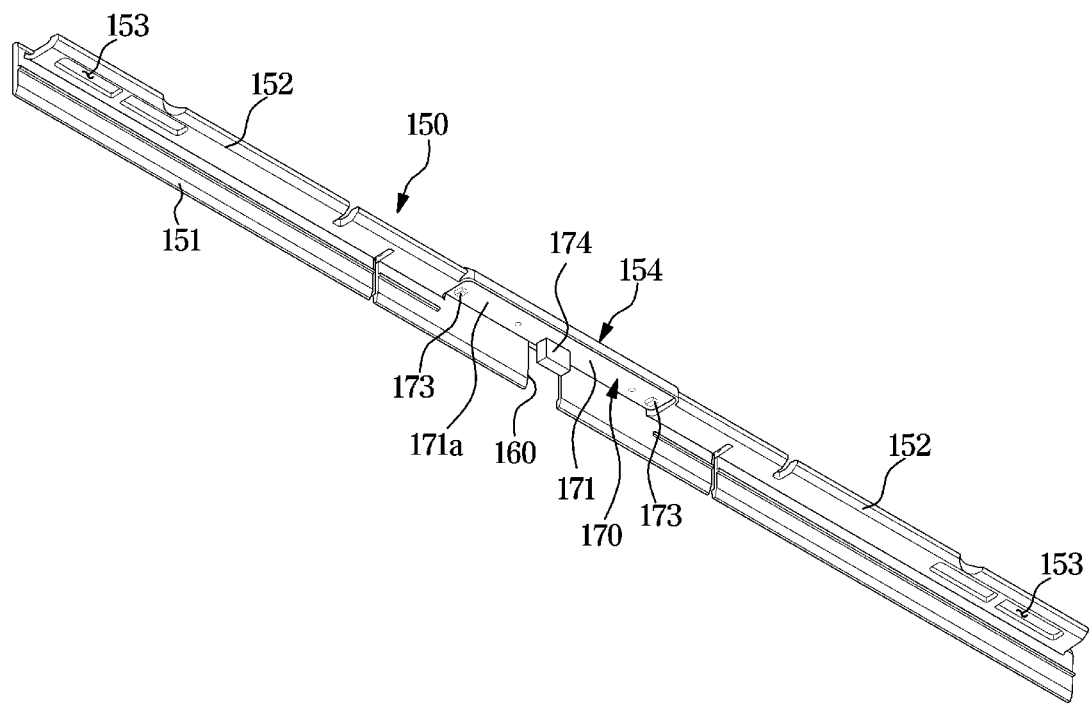
FIG. 13 is a bottom view of the upper fixer and the microphone module according to an embodiment of the disclosure, particularly illustrating a state in which the microphone module is mounted to the upper fixer.
Figure 14:
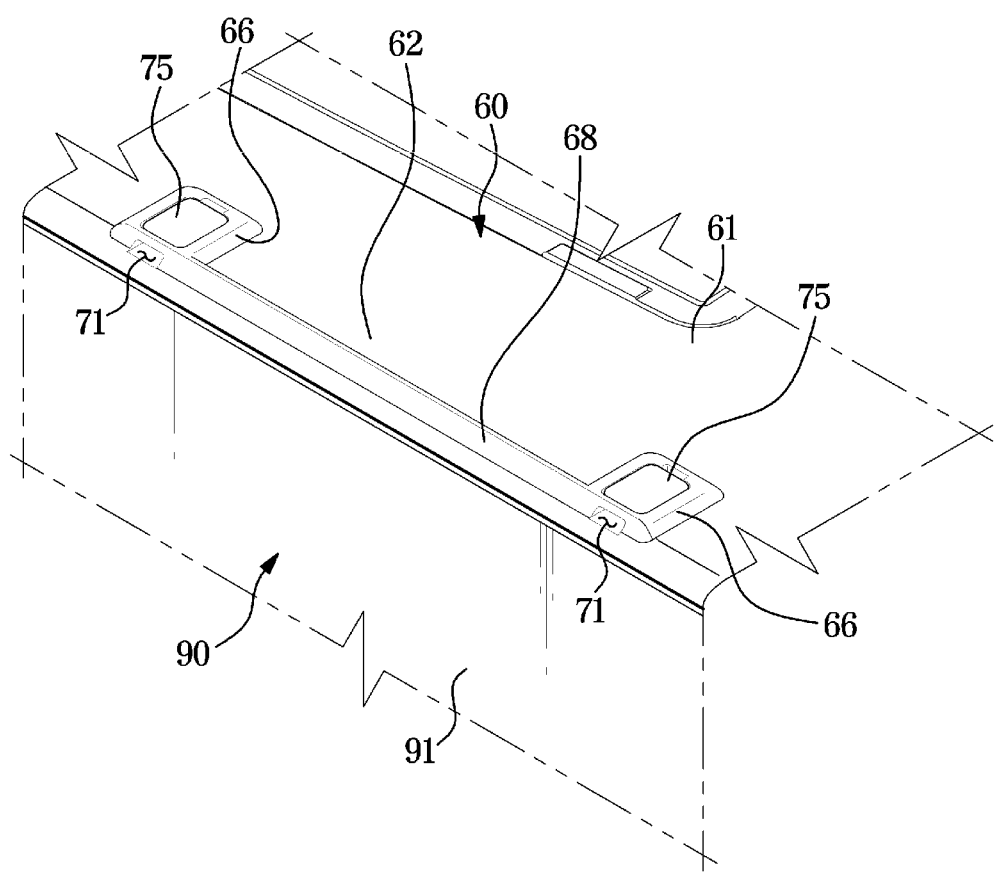
FIG. 14 is an enlarged view of an upper portion of the upper cap according to an embodiment of the disclosure.
Figure 15:
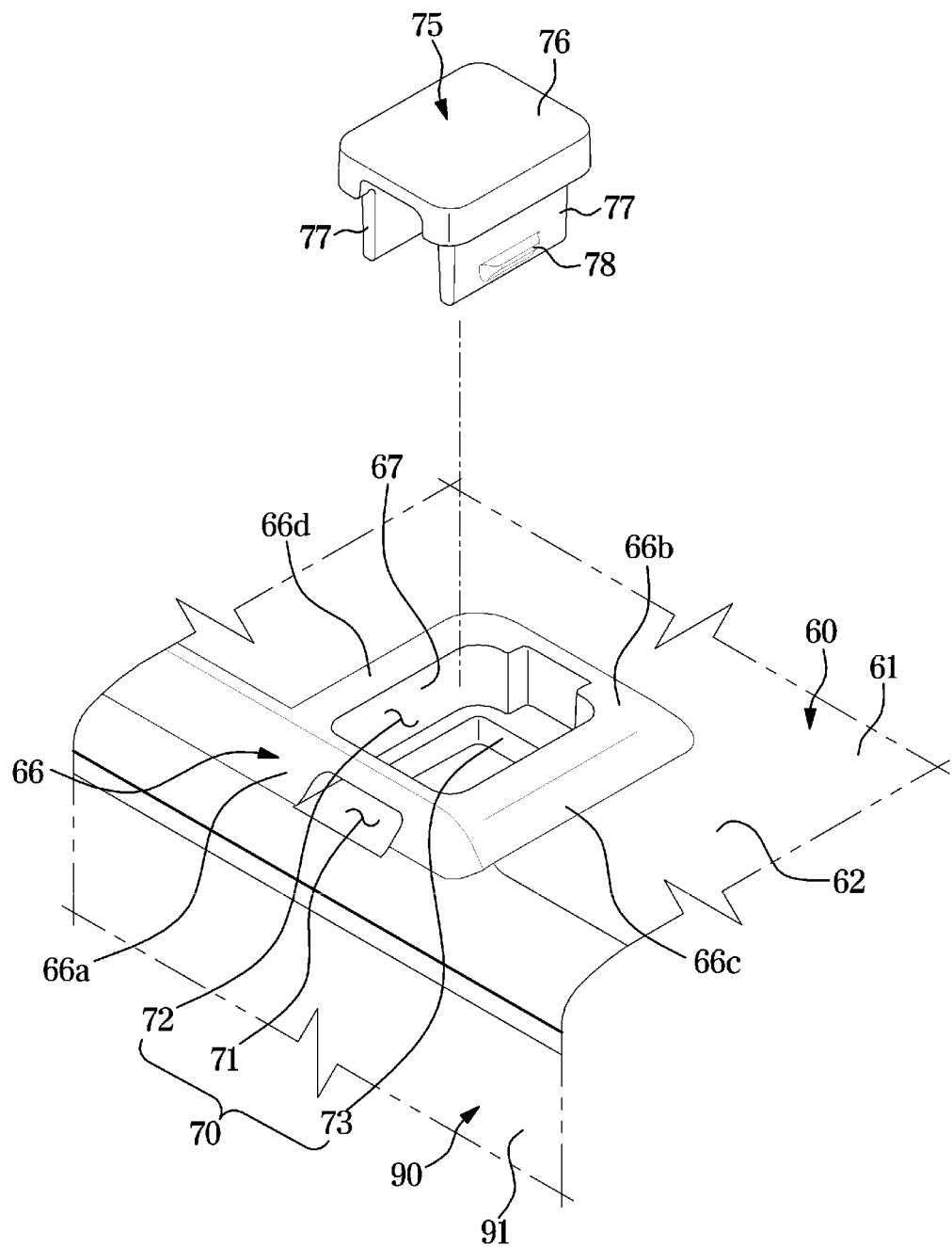
FIG. 15 is a view illustrating a state in which a cap cover is separated from the upper cap according to an embodiment of the disclosure.
Figure 16:
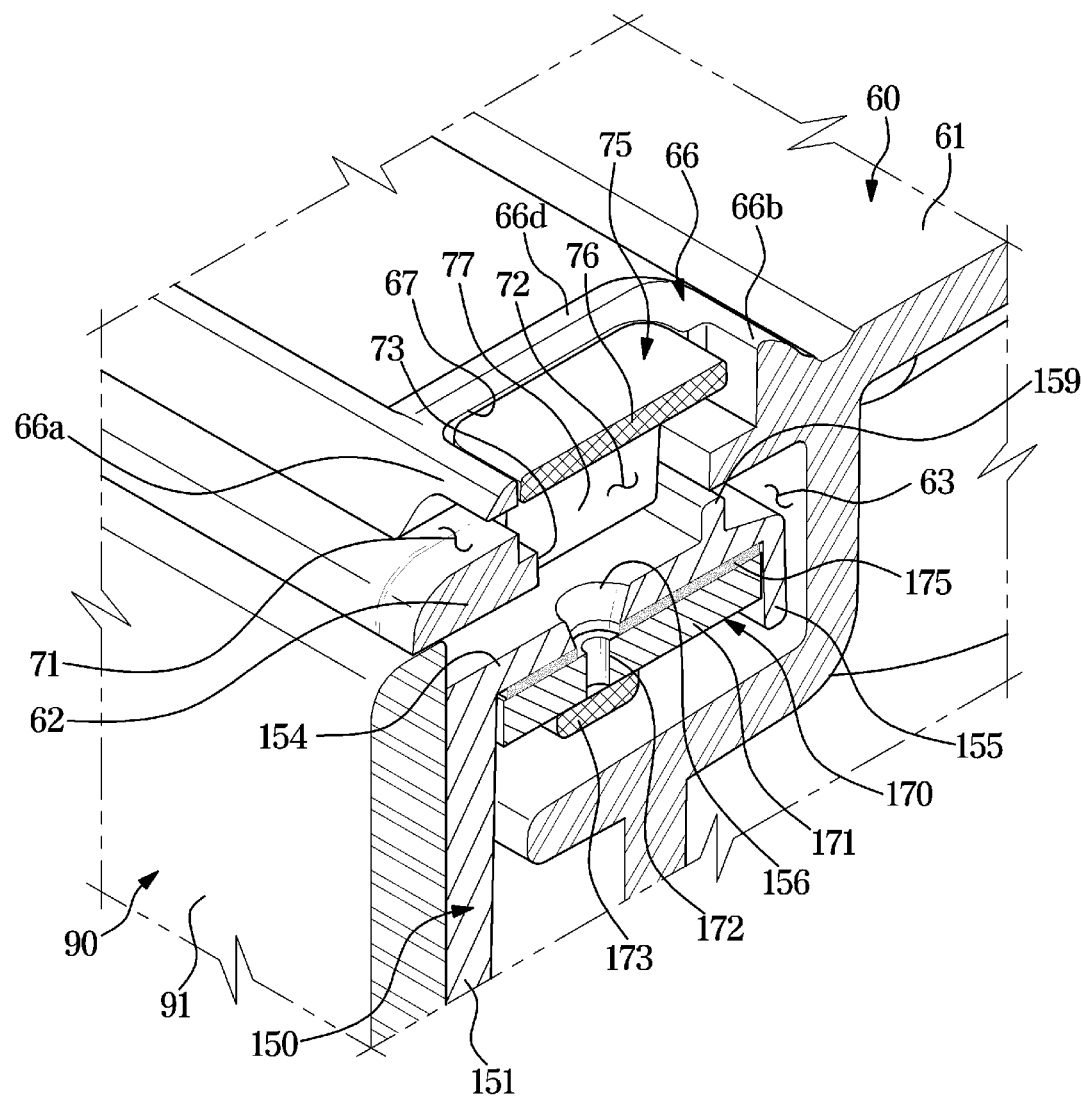
FIG. 16 is a perspective cross-sectional view illustrating the microphone module attached to an upper trim, and a voice path formed in the upper cap according to an embodiment of the disclosure.
Figure 17:
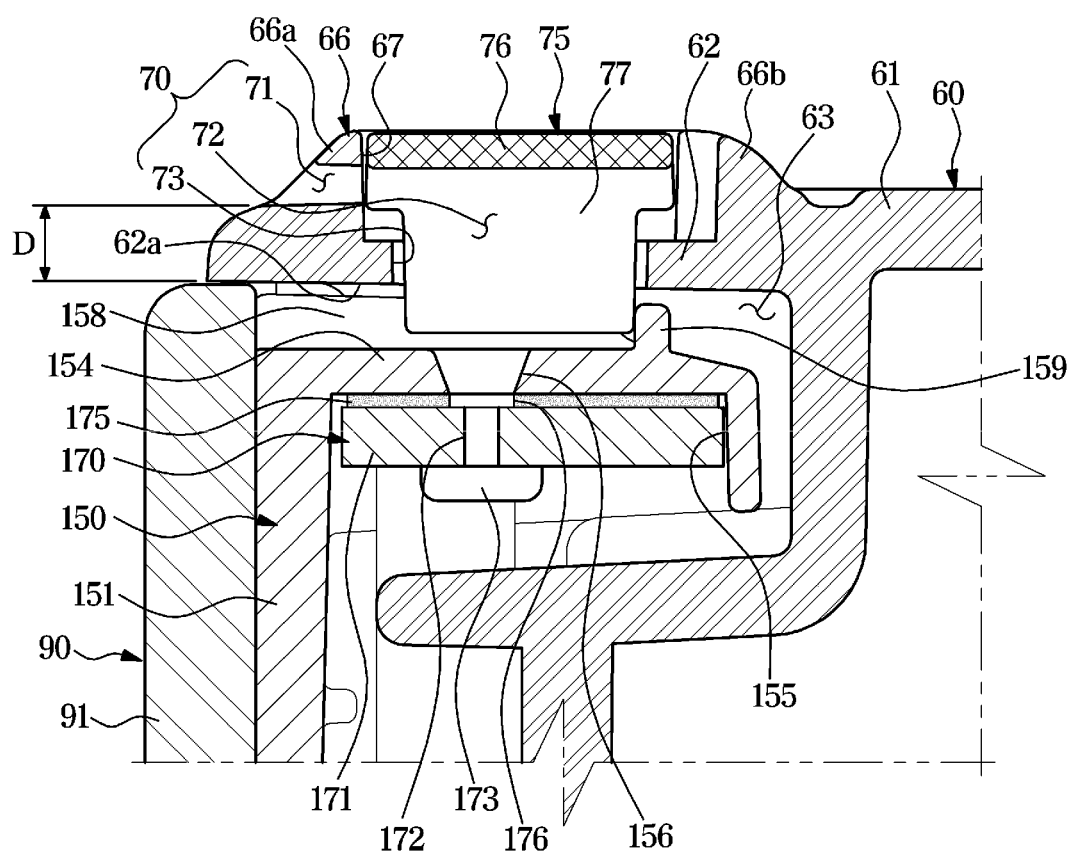
FIG. 17 is a view illustrating the microphone module attached to the upper trim and the voice path formed in the upper cap according to an embodiment of the disclosure, particularly a cross-sectional view taken along a Y-Z plane.
Figure 18:
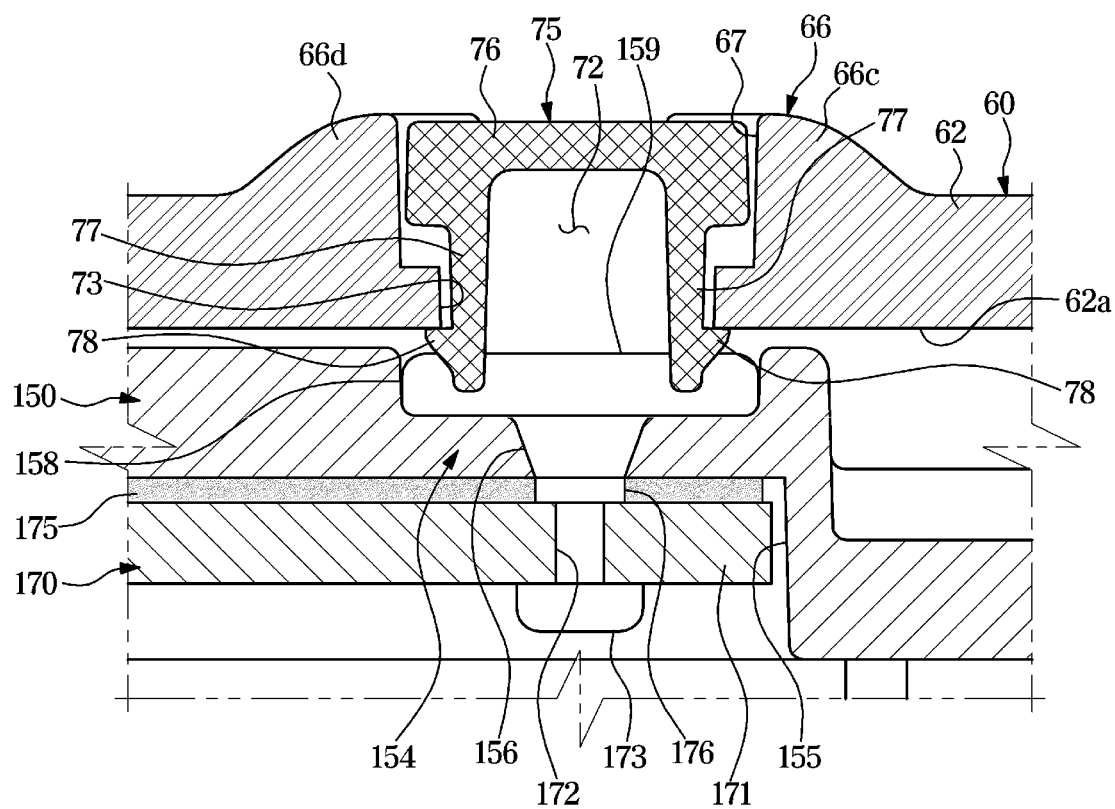
FIG. 18 is a view illustrating the microphone module attached to the upper trim and the voice path formed in the upper cap according to an embodiment of the disclosure, particularly a cross-sectional view taken along a X-Y plane.

FIG. 11 is a view illustrating an upper fixer and a microphone module according to an embodiment of the disclosure. FIG. 12 is a bottom view of the upper fixer and the microphone module according to an embodiment of the disclosure, particularly illustrating a state in which the upper fixer and the microphone module are separated. FIG. 13 is a bottom view of the upper fixer and the microphone module according to an embodiment of the disclosure, particularly illustrating a state in which the microphone module is mounted to the upper fixer. FIG. 14 is an enlarged view of an upper portion of the upper cap according to an embodiment of the disclosure. FIG. 15 is a view illustrating a state in which a cap cover is separated from the upper cap according to an embodiment of the disclosure. FIG. 16 is a perspective cross-sectional view illustrating the microphone module attached to an upper trim and a voice path formed in the upper cap according to an embodiment of the disclosure. FIG. 17 is a view illustrating the microphone module attached to the upper trim and the voice path formed in the upper cap according to an embodiment of the disclosure, particularly a cross-sectional view taken along a Y-Z plane. FIG. 18 is a view illustrating the microphone module attached to the upper trim and the voice path formed in the upper cap according to an embodiment of the disclosure, particularly a cross-sectional view taken along a X-Y plane.

The microphone module and the voice path according to an embodiment of the disclosure will be described with reference to FIGS. 11 to 18.

The microphone module 170 may include a microphone substrate 171 and a microphone 173 mounted on the microphone substrate 171. The microphone substrate 171 may include a printed circuit board. The microphone substrate 171 may include a first surface 171a and a second surface 171b opposite to the first surface 171a. The first surface 171a may be referred to as a mounting surface 171a on which the microphone 173 is mounted. The second surface 171b may be referred to as an adhesive surface 171b.

The microphone 173 may include a microphone. The microphone 173 may be configured to convert an acoustic signal such as voice into an electrical signal. The microphone 173 may be a condenser type including a diaphragm.

The microphone module 170 may include one or more microphones 173. For example, the microphone module 170 may include a plurality of microphones 173. Because the microphone module 170 includes the plurality of microphones 173, noise may be effectively removed, and sound quality and recognition rate of the microphone module 170 may be improved.

The microphone substrate 171 may include a substrate voice hole 172 formed at a position corresponding to the microphone 173. The substrate voice hole 172 may be formed to penetrate the microphone substrate 171. The substrate voice hole 172 may be formed in plurality at positions corresponding to the plurality of microphones 173.

The microphone module 170 may be mounted on the microphone module mounting member 154 of the upper trim 150. The microphone module mounting member 154 may include a microphone module mounting space 155 formed on a lower surface of the microphone module mounting member 154. The microphone module 170 may be mounted on the microphone module mounting member 154 to be received in the microphone module mounting space 155. The microphone module 170 may be mounted on the microphone module mounting member 154 to allow the mounting surface 171a of the microphone substrate 171 to face downward. That is, when the microphone substrate 171 is mounted on the microphone module mounting member 154, the microphone 173 may be disposed to face downward.

When the upper trim 150 is received in the trim receiving space 63, the microphone module 170 mounted on the upper trim 150 may also be received in the trim receiving space 63 together with the upper trim 150.

The upper trim 150 may include a trim voice hole 156 formed at a position corresponding to the substrate voice hole 172. The trim voice hole 156 may be formed to penetrate the upper trim 150. The trim voice hole 156 may be formed in the microphone module mounting member 154. Voice received through the voice path 70 formed in the upper cap 60 may be received by the microphone 173 through the trim voice hole 156 and the substrate voice hole 172.

A sealing member 175 may be arranged between the microphone module mounting member 154 of the upper trim 150 and the microphone module 170. The sealing member 175 may fix the microphone module 170 to the microphone module mounting member 154. The sealing member 175 may prevent a gap from being generated between the lower surface of the microphone module mounting member 154 and the second surface 171b of the microphone substrate 171. That is, the sealing member 175 may allow the lower surface of the microphone module mounting member 154 and the second surface 171b of the microphone substrate 171 to come into close contact with each other.

For this, the sealing member 175 may be formed of an elastic rubber material or non-woven fabric. Adhesive may be applied on both sides of the sealing member 175. The sealing member 175 may include a sealing member voice hole 176 to correspond to the trim voice hole 156 and the substrate voice hole 172. As the lower surface of the microphone module mounting member 154 in close contact with the second surface 171b of the microphone substrate 171 through the sealing member 176, the voice passing through the trim sound hole 156 may be collected to the microphone 173 through the substrate voice hole 172 without leakage.

The microphone module 170 may include a microphone connector 174 to be electrically connected to an external circuit. The microphone connector 174 may be provided on the mounting surface 171a of the microphone substrate 171. Accordingly, when the microphone module 170 is mounted on the microphone module mounting member 154 of the upper trim 150, the microphone connector 174 may be positioned to face the lower side of the microphone substrate 171. Therefore, in a state in which the microphone module 170 is mounted on the microphone module mounting member 154 of the upper trim 150, other connectors may be easily coupled to the microphone connector 174.

The upper trim 150 may include a connector receiving member 160 to easily couple other connectors to the microphone connector 174. The connector receiving member 160 may be formed by cutting a portion of the upper trim 150. The connector receiving member 160 may be formed by cutting the upper trim body 151 of the upper trim 150. A space, in which at least a portion of the microphone connector 174 is disposed, may be formed in the connector receiving member 160. A space, in which at least a portion of other connector coupled to the microphone connector 174 is disposed, may be formed in the connector receiving member 160. For example, at least a portion of the second connector 120 (refer to FIG. 6) coupled to the microphone connector 174 may be disposed in the connector receiving member 160.

Referring FIGS. 14 to 18, the upper cap 60 may include the voice path 70 for receiving voice. The voice path 70 may receive external voice and guide the received external voice to the trim voice hole 156 of the upper trim 150. The voice guided to the trim voice hole 156 may be collected to the microphone 173 through the substrate voice hole 172.

The voice path 70 may include a voice guide hole 73 formed in the front upper wall 62 of the upper cap 60. The voice guide hole 73 may be formed to vertically penetrate the upper front wall 62.

The upper cap 60 may include a cap protrusion 66 protruding upward from the front upper wall 62 to form at least a portion of the voice path 70. The cap protrusion 66 may be formed to protrude upward from a periphery of the voice guide hole 73 of the front upper wall 62. The cap protrusion 66 may be integrally formed with the upper cap 60. That is, the cap protrusion 66 may be integrally injection molded with the upper cap 60. Alternatively, the cap protrusion 66 may be formed separately from the upper cap 60 and then coupled to the upper surface of the upper cap 60.

The cap protrusion 66 may be formed to be gently inclined toward the center of the cap protrusion 66 from the lower side to the upper side. As shown in FIG. 14, the cap protrusion 66 may be provided in plurality to correspond to the plurality of microphones 173. The plurality of cap protrusions 66 may be connected by a protrusion connector 68.

The voice path 70 may include a voice guide space 72 formed inside the cap protrusion 66. The voice guide space 72 may be a space surrounded by the cap protrusion 66. The voice guide hole 73 may be connected to the lower side of the voice guide space 72. That is, the lower side of the voice guide space 72 may be open.

An upper side of the voice guide space 72 may be open. That is, a protrusion upper opening 67 may be formed on the upper side of the voice guide space 72. The protrusion upper opening 67 may be covered by a cap cover 75 to be described later.

However, according to embodiments, the cap protrusion 66 may be formed to allow the upper side of the voice guide space 72 not to be opened.

The cap protrusion 66 may include a cap front protrusion 66a, a cap rear protrusion 66b, a cap left protrusion 66c, and a cap right protrusion 66d. That is, the cap protrusion 66 may have a substantially rectangular shape when viewed from above. However, the shape of the cap protrusion 66 is not limited thereto, and other shapes such as a triangle and a circle are also possible. That is, it is sufficient that the cap protrusion 66 forms a closed space on the X-Y plane to form the voice guide space 72.

The voice path 70 may include a voice input hole 71 formed in the cap protrusion 66. The voice input hole 71 may be formed in at least one of the cap front protrusion 66a, the cap rear protrusion 66b, the cap left protrusion 66c, and the cap right protrusion 66d. For example, the voice input hole 71 may be formed in the cap front protrusion 66a. Because the voice input hole 71 is formed in the cap front protrusion 66a, voice generated from the front of the refrigerator may be efficiently received.

The voice input hole 71 may be formed to penetrate the cap protrusion 66. Accordingly, the voice input hole 71 may be connected to the voice guide space 72.

The voice input hole 71 may be formed to be spaced apart from the lower surface 62a of the front upper wall 62 of the upper cap 60 by a predetermined distance D (refer to FIG. 17). That is, the voice input hole 71 may be separated from the trim receiving space 63. The voice input hole 71 may be spaced apart from the upper end of the front panel 90.

Instead of the front panel 90, a portion of the front upper wall 62 may be positioned right under the voice input hole 71. The lower side of the voice input hole 71 may not be opened. Therefore, when viewed from the front of the refrigerator, the lower surface 62a of the front upper wall 62 may be formed in a straight line without a cut in the left and right direction. Because the lower surface 62a of the front upper wall 62 is formed in a straight line without a cut in the left and right direction when viewed from the front of the refrigerator, aesthetics may be improved.

The upper cap 60 may include the cap cover 75 provided to cover the protrusion upper opening 67. Because the cap cover 75 covers the protrusion upper opening 67, it is possible to prevent a state in which moisture or other foreign substances penetrate into the voice guide space 72 through the protrusion upper opening 67.

The cap cover 75 may be coupled to the upper cap 60. For example, the cap cover 75 may be inserted into the voice guide space 72 through the protrusion upper opening 67. Alternatively, without being inserted into the voice guide space 72, the cap cover 75 may be provided to cover the protrusion upper opening 67 on the outside of the protrusion upper opening 67. The cap cover 75 may be provided to cover other areas of the upper cap 60 as well as the protrusion upper opening 67. Furthermore, the cap cover 75 may be provided to cover the entire upper surface of the upper cap 60.

The cap cover 75 may include a cap cover body 76 provided to have a shape corresponding to the protrusion upper opening 67 so as to cover the protrusion upper opening 67. A lower surface of the cap cover body 76 may form at least a part of the voice guide space 72. For example, the lower surface of the cap cover body 76 may form the upper side of the voice guide space 72.

The cap cover 75 may include a cap cover leg 77 extending downward from the cap cover body 76. One or more cap cover legs 77 may be formed. For example, the cap cover leg 77 may be formed in plurality. The plurality of cap cover legs 77 may be formed to be spaced apart from each other in the left and right direction (X-axis direction). Voice may be guided between the plurality of cap cover legs 77 spaced apart from each other.

A cover hooking member 78 may be formed at a lower end of the cap cover leg 77. The cover hooking member 78 may be provided to hook to the lower surface 62a of the front upper wall 62 of the upper cap 60.

When the cap cover 75 is inserted into the voice guide space 70 through the protrusion upper opening 67, the cap cover leg 77 may be elastically deformed in a retracting direction and at the same time, the cover hooking member 78 may be moved to under the front upper wall 62. When the cap cover 75 is inserted to allow the cover hooking member 78 to be positioned under the front upper wall 62, the cap cover leg 77 may return to its original shape in the direction in which the cap cover leg 77 opens and at the same time, the cover hooking member 78 may hook to the lower surface 62a of the front upper wall 62. Accordingly, the cap cover 75 may be coupled to the upper cap 60.

The upper trim 150 may include a cap cover receiving member 158 to receive at least a portion of the cap cover leg 77. The cap cover receiving member 158 may be concavely formed on an upper surface of the microphone mounting member 154.

The upper trim 150 may include a trim protrusion 159 provided to be coupled to the cap cover 75. The trim protrusion 159 may protrude upward from the upper trim 150. When the upper trim 150 is inserted into the trim receiving space 63 of the upper cap 60 and the cap cover 75 is coupled to the upper cap 60, the trim protrusion 159 may be coupled to the cap cover 75.

The trim protrusion 159 may be coupled to the cover leg 77 of the cap cover 75. The trim protrusion 159 may support one surface of the cover leg 77 to prevent the upper trim 150, which is inserted into the trim receiving space 63, from being separated from the trim receiving space 63.

With the above structure, the cap cover 75 may fix the front panel 90 to the door body 40 together with the fixer 79.

As described above, the voice path 70 formed in the upper cap 60 may include the voice input hole 71, the voice guide space 72, and the voice guide hole 73. External voice may pass through the voice path 70 of the upper cap 60 and be transferred to the microphone module 170 disposed in the trim receiving space 63 of the upper cap 60.

The voice path 70 may be provided in plurality to correspond to the number of microphones 173 included in the microphone module 170. The plurality of voice paths 70 may be provided to be separated from each other. A downstream end of the voice path 70 may be arranged to be perpendicular to the microphone 173 of the microphone module 170 to allow voice to be efficiently transmitted to the microphone 173. That is, the trim voice hole 156 of the upper trim 150 and the substrate voice hole 172 of the microphone module 170 may be positioned below the voice guide space 72 and the voice guide hole 73 in the vertical direction.

Figure 19:
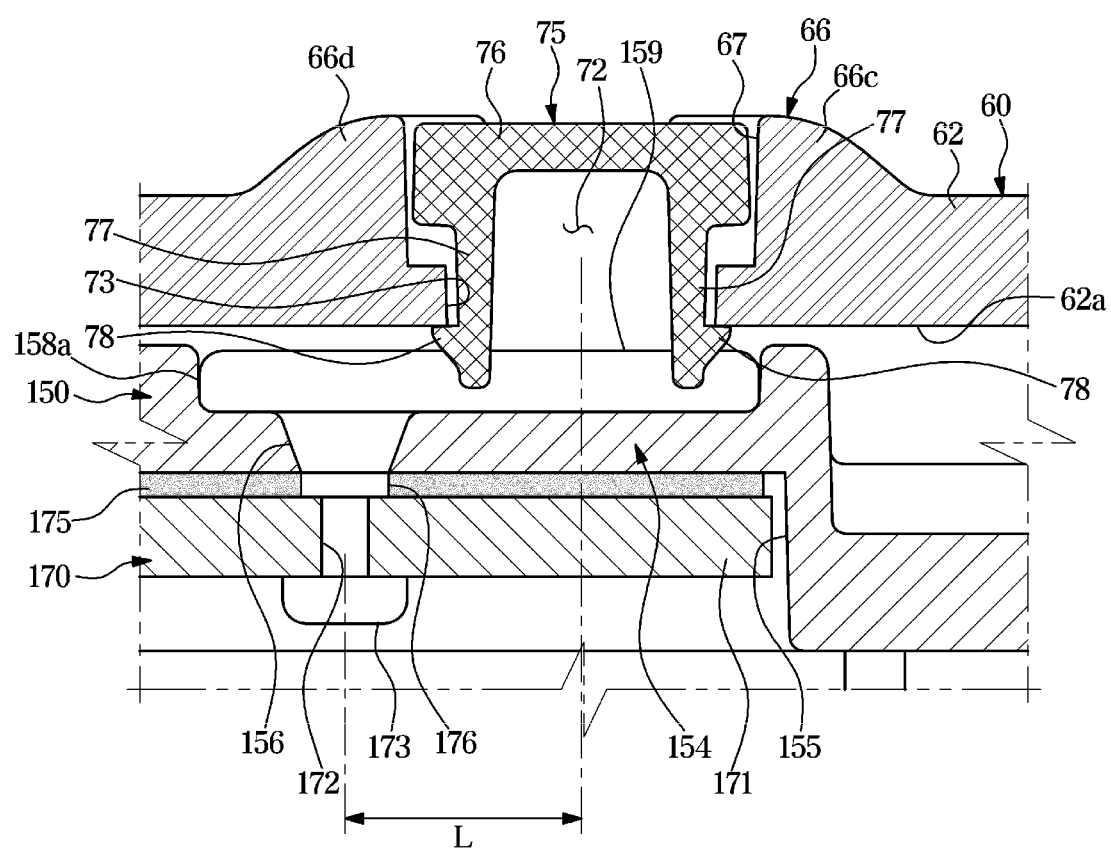
FIG. 19 is other view illustrating the microphone module attached to the upper trim and the voice path formed in the upper cap according to an embodiment of the disclosure, particularly a cross-sectional view taken along the X-Y plane.

FIG. 19 is other view illustrating the microphone module attached to the upper trim and the voice path formed in the upper cap according to an embodiment of the disclosure, particularly a cross-sectional view taken along the X-Y plane.

Referring to FIG. 19, the downstream end of the voice path 70 and the microphone 173 of the microphone module 170 may be misaligned so as not to be perpendicular to each other. That is, the trim voice hole 156 of the upper trim 150 and the microphone module 170 may be arranged vertically under the voice guide space 72 and the voice guide hole 73 to be horizontally spaced apart by a predetermined distance L from the voice guide space 72 and the voice guide hole 73.

The cap cover receiving member 158a may be formed to extend in the left and right direction (X-axis direction) to connect the voice guide hole 73 and the trim voice hole 156.

As mentioned above, as the downstream end of the voice path 70 and the microphone 173 of the microphone module 170 are misaligned so as not to be perpendicular to each other, it is possible to prevent a state in which moisture or foreign substances penetrate into the microphone 173 through the voice path 70.

Figure 20:
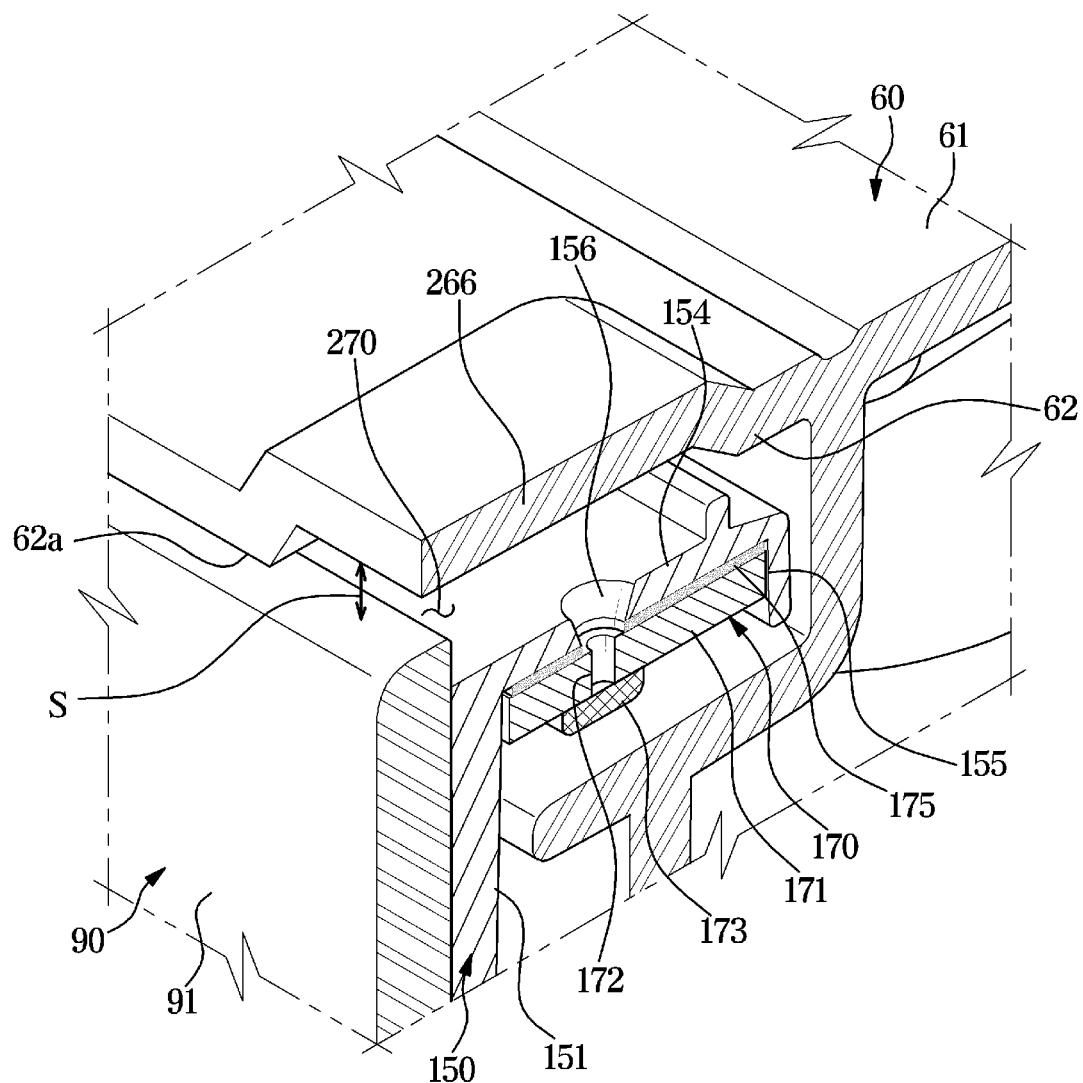
FIG. 20 is a perspective cross-sectional view illustrating a microphone module attached to an upper trim, and a voice path formed between a stepped member of an upper cap and a front panel according to an embodiment of the disclosure.

FIG. 20 is a perspective cross-sectional view illustrating a microphone module attached to an upper trim and a voice path formed between a stepped member of an upper cap and a front panel according to an embodiment of the disclosure.

The same reference numerals are assigned to components the same as those of the above-described embodiment, and descriptions thereof may be omitted.

The upper cap 60 may include the front upper wall 62 protruding forward from the upper portion of the upper cap body 61. The upper cap 60 may include the trim receiving space 63 formed below the front upper wall 62.

The upper cap 60 may include a voice path 270 provided to guide external voice to the microphone module 170 mounted on the upper trim 150. The voice path 270 may receive external voice and guide the voice to the trim voice hole 156 of the upper trim 150. The voice guided to the trim voice hole 156 may be collected to the microphone 173 through the substrate voice hole 172.

The upper cap 60 may include a stepped member 266 formed by bending upward from the front upper wall 62 to form at least a portion of the voice path 270. A slit S may be formed between a front end of the stepped member 266 and the front panel 90. The slit S may have a height sufficient to allow voice to pass through. The slit S may be elongated in the left and right direction. The voice path 270 may include the slit S formed between the front end of the stepped member 266 and the front panel 90.

As described above, the voice path 270 may be implemented in the upper cap 60 with a relatively simple configuration.

The above mentioned-disclosure is not applied only to the above-described refrigerator and the door of the refrigerator, but may also be applicable to a home appliance including a main body including a cavity, which is an internal space for performing a specific function, and a door configured to open and close the cavity, and the door of the home appliance.

For example, the above mentioned-disclosure may be applied to a cooking appliance including a cooking chamber, a dishwasher including a washing chamber, a dryer including a drying chamber, a clothes treating device including a clothes treating chamber, and an air conditioner including a heat exchange chamber in which a heat exchanger is disposed.

As is apparent from the above description, a refrigerator may include a door body rotatably coupled to a main body so as to open and close a storage compartment, and a front panel detachably mounted on the door body and including a microphone module arranged on a rear surface of the front panel. However, a microphone hole provided to transmit voice to the microphone module may not be provided on the front panel.

Therefore, aesthetics may be improved because the microphone hole is omitted. Further, cost may be reduced because a process for forming the microphone is not required.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
a main body having a storage compartment;
a door body rotatably coupled to the main body to open and close the storage compartment, the door body including:
a door outer plate forming a front surface of the door body, and
an upper cap coupled to an upper portion of the door outer plate, the upper cap having a fixer opening on an upper side of the upper cap, a trim opening on a front side of the upper cap, and a trim receiving space;
a front panel including an upper trim, the upper trim including an upper trim body and a microphone module mounting member extending rearward from the upper trim body, and the microphone module mounting member including a microphone module mounting space on a lower surface of the microphone module mounting member;
a fixer; and
a microphone module mounted on the microphone module mounting member to be received in the microphone module mounting space to thereby be coupled to the upper trim,
wherein the door body, the front panel, and the fixer are configured so that
the upper trim is insertable into the trim receiving space through the trim opening, and,
with the upper trim inserted into the trim receiving space through the trim opening, the fixer is insertable into the trim receiving space through the fixer opening to be coupled to the upper trim, to detachably couple the front panel to a front side of the door body with the microphone module disposed in the trim receiving space to receive voice through a voice path formed in the upper cap.

2. The refrigerator of claim 1, wherein
the upper cap includes:
a cap body,
a front upper wall on a front upper side of the cap body, so that the trim receiving space is below the front upper wall, and
a voice guide hole penetrating the front upper wall and forming a part of the voice path.

3. The refrigerator of claim 2, wherein the upper cap includes a cap protrusion protruding upward from a periphery of the voice guide hole, and a voice guide space surrounded by the cap protrusion and forming a part of the voice guide path.

4. The refrigerator of claim 3, wherein
the cap protrusion includes a cap front protrusion in front of the voice guide space, and
a voice input hole is formed in the cap front protrusion and forms a part of the voice path.

5. The refrigerator of claim 4, wherein
the voice input hole is spaced apart from a lower surface of the front upper wall by a predetermined height.

6. The refrigerator of claim 3, wherein
the upper cap includes a protrusion upper opening on an upper side of the voice guide space, and
the upper cap includes a cap cover that is coupleable to the upper cap to cover the protrusion upper opening.

7. The refrigerator of claim 6, wherein the cap cover includes:
a cover body configured to cover the protrusion upper opening with a lower surface of the cover body forming at least a part of the voice path, and
a cover leg extending downward from the lower surface of the cover body and including a cover hooking member configured to hook to a lower surface of the front upper wall.

8. The refrigerator of claim 6, wherein
the upper trim includes a trim protrusion protruding upward and configured to be coupled to the cap cover in a state in which the upper trim is inserted into the trim receiving space and the cap cover is coupled to the upper cap.

9. The refrigerator of claim 1, wherein
the microphone module includes a microphone substrate, and a microphone on a mounting surface of the microphone substrate,
the microphone module is mounted in the microphone module mounting space with the mounting surface of the microphone substrate facing downward, and
the microphone substrate includes a substrate voice hole penetrating the microphone substrate at a position corresponding to the microphone.

10. The refrigerator of claim 9, wherein
the upper trim includes a trim voice hole at a position corresponding to the substrate voice hole.

11. The refrigerator of claim 10, further comprising:
a sealing member between the microphone module mounting member and the microphone module,
wherein the sealing member includes a sealing member voice hole at a position corresponding to the trim voice hole and the substrate voice hole.

12. The refrigerator of claim 9, wherein
the microphone module includes a connector electrically connected to an external circuit, and
the connector is on the mounting surface of the microphone substrate and positioned below the microphone substrate.

13. The refrigerator of claim 12, wherein
the upper trim includes a connector receiving member configured to receive the connector or other connector connected to the connector.

14. The refrigerator of claim 1, wherein
the microphone module includes a microphone substrate, and a plurality of microphones spaced apart from each other on a mounting surface of the microphone substrate, and
the voice path includes a plurality of voice paths separated from each other to correspond to the plurality of microphones.

* * * * *